United States Patent
Nakano et al.

[11] Patent Number: 5,987,438
[45] Date of Patent: Nov. 16, 1999

[54] ELECTRONIC WALLET SYSTEM

[75] Inventors: Misuzu Nakano, Yokohama; Shigeyuki Itoh, Kawasaki; Akira Kanehira, Tokyo; Kenji Matsumoto, Yokohama, all of Japan

[73] Assignee: Hitachi, Ltd., Tokyo, Japan

[21] Appl. No.: 08/638,813

[22] Filed: Apr. 29, 1996

[51] Int. Cl.⁶ .................................................. G06F 17/00
[52] U.S. Cl. .................... 705/41; 235/375; 340/825.3; 340/825.31; 711/163; 711/164
[58] Field of Search ...................... 235/375, 379, 235/380, 381, 382, 383; 340/825.3, 825.31, 825.35; 705/1, 14, 16, 17, 18, 41; 711/154, 163, 164

[56] References Cited

U.S. PATENT DOCUMENTS

| | | | |
|---|---|---|---|
| 4,105,156 | 8/1978 | Dethloff | 235/441 |
| 4,305,059 | 12/1981 | Benton | 340/825.33 |
| 4,534,018 | 8/1985 | Eckert et al. | 365/228 |
| 4,547,853 | 10/1985 | Eckert | 705/405 |
| 4,706,215 | 11/1987 | Kirschner et al. | 705/405 |
| 4,734,567 | 3/1988 | Hansbauer | 235/482 |
| 4,742,215 | 5/1988 | Daughters et al. | 235/487 |
| 4,802,218 | 1/1989 | Wright et al. | 380/23 |
| 4,812,994 | 3/1989 | Taylor et al. | 705/410 |
| 5,128,523 | 7/1992 | Diehl et al. | 235/441 |
| 5,221,838 | 6/1993 | Gutman et al. | 235/379 |
| 5,310,999 | 5/1994 | Claus et al. | 235/384 |
| 5,541,583 | 7/1996 | Mandelbaum | 340/825.54 |
| 5,623,637 | 4/1997 | Jones et al. | 711/164 |
| 5,634,000 | 5/1997 | Wicht | 395/182.08 |
| 5,770,844 | 6/1998 | Henn | 235/380 |
| 5,811,770 | 9/1998 | Bonnemoy | 235/380 |

FOREIGN PATENT DOCUMENTS

| | | |
|---|---|---|
| 0159530 | 10/1985 | European Pat. Off. . |
| 0355372 | 2/1990 | European Pat. Off. . |
| 2589603 | 5/1987 | France . |
| 2634300 | 1/1990 | France . |
| 2659770 | 9/1991 | France . |
| 0621570 | 10/1994 | France . |
| 1177181 | 7/1989 | Japan . |
| 1231451 | 9/1989 | Japan . |
| 1266693 | 10/1989 | Japan . |
| 392966 | 4/1991 | Japan . |
| 594458 | 4/1993 | Japan . |
| 5504643 | 7/1993 | Japan . |
| 5266273 | 10/1993 | Japan . |
| 6503913 | 4/1994 | Japan . |
| 2057740 | 4/1981 | United Kingdom . |
| 9110971 | 7/1991 | WIPO . |
| 9116691 | 10/1991 | WIPO . |

*Primary Examiner*—Edward R. Cosimano
*Attorney, Agent, or Firm*—Antonelli, Terry, Stout & Kraus, LLP

[57] ABSTRACT

An electronic wallet system easy to use and having high security is provided. The electronic wallet system includes an IC card for storing electronic money information, an IC card reader/writer for reading data from, and writing data into, the IC card, an IC card loader unit for loading the IC card into, and unloading the IC card from, the IC card loader unit, an IC card load controller unit for controlling a load/unload operation of the IC card, and a lock signal generator unit for generating an IC card lock signal in response to an activation of an unload operation by the IC card load controller unit. An electronic wallet system with an ID number specific to the system, applied to a POS system, includes a system ID verification unit and an input unit for inputting data to the system, wherein an IC card can be unloaded in response to an activation of an unload operation by a load controller unit and an input of the system ID from the input unit.

28 Claims, 25 Drawing Sheets

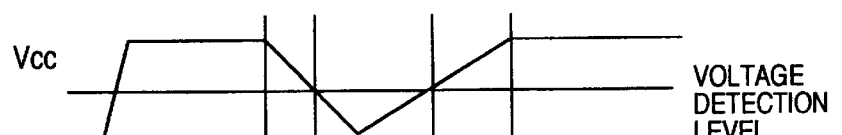
FIG.6A
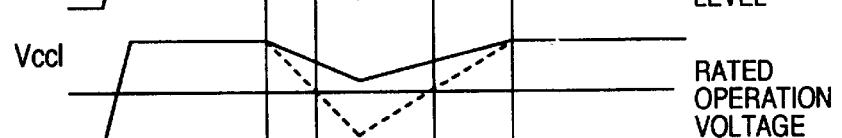
FIG.6B
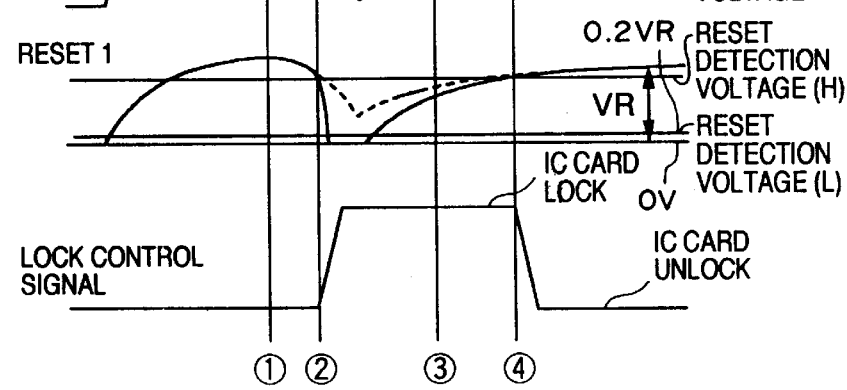
FIG.6C
FIG.6D

ELECTRONIC WALLET SYSTEM

CROSS-REFERENCE TO RELATED APPLICATION

This application relates to an application U.S. Ser. No. 08/690,358 filed on Jul. 26, 1996 based on Japanese Patent Application No. 07-197573 filed on Aug. 2, 1995 and assigned to the present assignee.

This application relates to Matsumoto et al U.S. Ser. No. 08/638,591, filed Apr. 29, 1996.

BACKGROUND OF THE INVENTION 1. Field of the Invention

The present invention relates to an IC card with an embedded or mounted IC and an IC card reader/writer for reading data from, and writing data into, the IC card. More particularly, the invention relates to a point of sales management system applied to an electronic wallet system using IC cards storing cash information, and to a portable terminal for the electronic wallet system.

2. Description of the Related Art

One example of a system using an IC card with a built-in microprocessor (CPU) and/or a memory is a system using IC cards for storing cash information, as described in an article of a newspaper of Japanese Economic and Industrial Newspaper Company (NIKKEI) issued on Dec. 10, 1993, and in the publications of JP-A-3-92966, JP-A-6-503913, JP-A-5-266273, JP-A-594458, and JP-A-1-231451. With this system, shopping and money transfer are possible without having a check or credit card. In buying a thing, an IC card is inserted into a reader/processor terminal at a retail shop so that a remaining money value left in the IC card is displayed. When a password (ID) is entered, the money value used for buying the thing is transferred to the terminal. The retail shop inserts its own IC card into the terminal to transfer a sales money value and deposits it on the account of a bank through an automated-teller machine (ATM). Such settlements may be performed over a telephone.

If data necessary for settlements and transactions is recorded in an IC card, data can be distributedly managed among IC cardholders and a cost effective off-line system can be realized. For example, the transactions per day are stored in the IC card of a retail shop, and a sales money value is deposited on a bank account through ATM. In this manner, retail shops and banks are not required to be interconnected on line. Bank POS service interconnecting retail shops and banks 24 hours a day is expensive. If traffic of the on-line process is concentrated during the same time period, a response may often be delayed. Some nations have high line cost and bad line conditions. Large merits can be enjoyed by off-line of IC cards.

As different from magnetic cards, it is not easy to copy and forge IC cards. However, an IC card system dealing with cash information is concerned about the following issues. IC card may be stolen from a register of a POS system, or data may be illegally stolen from IC cards.

If one register of an IC card POS system is used by a plurality of register clerks, a register clerk may illegally transfer cash information, from an IC card storing cash information of a sales money value at a retail shop, into an IC card of the register clerk. Presently, in a system in which cash is dealt and a plurality of register clerks share one register at a department or gasoline stand, robbery of cash is becoming a serious problem.

Damages by robbery of cash at stores open 24 hours a day are increasing.

SUMMARY OF THE INVENTION

It is an object of the present invention to provide an electronic wallet system easy to use having high security, capable of automatically locking an IC card when it is unloaded from an IC card reader/writer, and automatically unlocking an IC card when loaded.

It is another object of the present invention to provide an electronic wallet system easy to use having high security, capable of preventing an illegal use of an IC card.

In order to achieve the above objects, the invention has the following aspects solving the above problems.

(1) According to one aspect of the invention, a means is provided for detecting an unload of an IC card from an IC card reader/writer and notifying the IC card of this unload, and a means is provided for locking the IC card. A means is provided for automatically unlocking an IC card when it is loaded into the IC card reader/writer.

(A) An IC card lock/unlock means provided at an IC card reader/writer.

First, an IC card lock means will be described.

An electronic wallet system having an IC card for storing electronic money information and an IC card reader/writer, the IC card reader/writer comprising: an interface unit for data transfer to and from the IC card; an IC card loader unit for loading the IC card in the IC card reader/writer; a load controller for controlling the IC card loader unit; a switch used when the IC card is unloaded from the IC card loader unit; an IC card lock signal generator for generating an IC card lock signal; and means for controlling the interface unit. The switch used when the IC card is unloaded from the IC card loader unit, is connected to the IC card lock signal generator and the IC card load controller, the IC card load controller is connected to the IC card loader unit, and the IC card lock signal is supplied to the IC card via the interface unit of the IC card reader/writer.

The electronic wallet system further comprises: a power detector for detecting whether a voltage supplied to the system has a predetermined voltage value; and a data save signal generator. The power detector activates the data save signal generator and the IC card lock controller.

Next, as the IC card unlock means corresponding to the above IC card lock means, the following three aspects (a) to (c) will be described.

(a) In an IC card unlock apparatus constituted by a combination of an IC card and an IC card reader/writer capable of reading data from, and writing data into, the IC card comprises a loader switch indicating whether the IC card is loaded on a loader unit of the IC card reader/writer, and a signal generator for generating an IC card unlock signal. The loader switch activates the IC card unlock signal generator, and the IC card unlock signal is supplied to the IC card via the interface of the IC card reader/writer.

(b) The IC card reader/writer comprises a current detector for detecting a current supplied to the IC card and an IC card unlock signal generator. The current detector activates the IC card unlock signal generator, and the IC card unlock signal is supplied to the IC card via the .interface unit of the IC card reader/writer.

(c) The IC card reader writer comprises a reset signal detector for detecting an input of a reset signal to the IC card, an IC card voltage detector, and an IC card unlock signal generator. The voltage detector and reset signal detector activate the IC card unlock signal generator, and the IC card unlock signal is supplied to the IC card via the interface unit of the IC card reader/writer.

(B) An IC card lock/unlock means provided in an IC card.

In an IC card unlock apparatus constituted by a combination of an IC card and an IC card reader/writer capable of reading data from, and writing data into, the IC card comprises: means for supplying power to in-circuits of the IC card; an in-circuit power source unit for supplying power to the IC card; connection means for receiving a control signal at the IC card; connection means for transferring data between the IC card and the IC card reader/writer; a memory (RAM) unit for storing data; a central processing unit (CPU) for computations; a memory (ROM) unit for storing fixed programs running on CPU; an in-circuit power source voltage detector for detecting a power source voltage in the IC card; a controller for locking the IC card when the in-circuit power source voltage in the IC card becomes lower than a predetermined value; and a controller for unlocking the IC card when the in-circuit power source voltage in the IC card becomes higher than a predetermined value and a control signal (reset signal) is inputted.

(C) An IC card lock/unlock system in which data transfer between an IC card and an IC card reader/writer is performed in a non-contact way.

In an IC card lock/unlock system in which data transfer between an IC card and an IC card reader/writer capable of reading data from, and writing data into, the IC card, is performed in a non-contact way, the IC card comprises: a memory (RAM) unit for storing data; a central processing unit (CPU) for computations; a memory (ROM) unit for storing fixed programs running on CPU; a transmission unit for transmitting data from the IC card; a modulator unit for modulating data of the IC card; a reception unit for receiving data from the IC card reader/writer at the IC card, a demodulator for demodulating data from the reception unit; a display unit for displaying a state of data transmission/reception; means for checking an end of data transmission/reception; means for supplying power from the reception unit to in-circuits of the IC card; an in-circuit power source voltage detector for detecting a power source voltage in the IC card; data save means operating when the power source voltage in the IC card becomes lower than a predetermined value; means for locking the IC card when the power source voltage in the IC card becomes lower than the predetermined value and after the end of data transmission/reception is confirmed; means for checking a start of data transmission/reception; and a controller for unlocking the IC card when the power source voltage in the IC card becomes higher than a predetermined value and after the start of data transmission/reception is confirmed.

(2) The aspect of the invention enhancing security of the IC card unlock method described in the above (1) will be described in the following. With the following arrangements, in a POS system, only a register (IC card reader/writer) assigned to a register clerk can be used.

(A) Three ID numbers of an IC card, an IC card reader/writer, and a user are verified to unlock each of them.

In an IC card lock/unlock system constituted by a combination of an IC card and an IC card reader/writer capable of reading data from, and writing data into, the IC card, the IC card reader/writer comprises: an interface unit for data transfer to and from the IC card; a memory unit for storing data; an input unit for inputting data to the system; means for controlling the memory unit, the input unit, and the interface unit; and an ID of the ID card reader/writer, and the IC card comprises: means for data transfer to and from the IC card reader/writer; a memory (RAM) unit for storing data; a central processing unit (CPU) for computations; and a memory (ROM) unit for storing fixed programs running on CPU; and an ID of the IC card, wherein the system further comprises: verification means for verifying the ID of the IC reader/writer and the ID of the IC card; verification means for verifying an ID entered from the input unit of the IC card reader/writer and the ID of the IC card; and a controller for unlocking the IC card if the plurality of IDs verified by the two verification means are judged to be verifiable.

(B) According to another aspect of the invention, the IC card reader/writer comprises verification means for verifying whether an ID entered from the input unit of the IC card reader/writer is a higher priority order (manager) ID, and the IC card comprises verification means for verifying, if the ID entered from the input unit of the IC card reader/writer is the higher priority order (manager) ID, this higher priority order (manager) ID and an ID of the IC card with the higher priority order (manager); and a controller for unlocking the IC card if the IDs verified by said two verification means are judged to be verifiable.

(C) According to a further aspect of the invention, two IDs of the IC card reader/writer and a user are verified to unlock the IC card reader/writer. The IC card is automatically unlocked when it is loaded into the IC card reader/writer.

In an IC card lock/unlock system constituted by a combination of an IC card and an IC card reader/writer capable of reading data from, and writing data into, the IC card, the IC card reader/writer comprises: verification means for verifying an ID entered from the input unit of the IC card reader/writer and an ID of the IC card reader/writer; and a controller for unlocking the IC card reader/writer if the IDs verified by the verification means are judged to be verifiable.

(3) Another aspect of the invention will be described in the following in which security of the IC card lock/unlock method described in the above (1) is improved by generating a random number at the same time when the IC card is locked and using the random number as an ID of the IC card.

(A) An IC card generates a random number which is used as an ID of the IC card, and the IC card is thereafter locked.

In an IC card lock system constituted by a combination of an IC card and an IC card reader/writer capable of reading data from, and writing data into, the IC card, the IC card comprises: an in-circuit power source voltage detector for detecting a power source voltage of in-circuits of the IC card; a random number generator for generating a random number; a memory unit for storing the random number, and a controller for locking the IC card when the power source voltage of in-circuits of the IC card becomes lower than a predetermined value.

The IC card reader/writer comprises: verification means for verifying an ID entered from the input unit of the IC card reader/writer and an ID of the IC card reader/writer; and a controller for unlocking the IC card reader/writer, and the IC card comprises a controller for unlocking the IC card if the IDs verified by the verification means are judged to be verifiable.

(B) A random number is generated in an IC card reader/writer and is used as an ID of an IC card which is then locked.

In an IC card lock system constituted by a combination of an IC card and an IC card reader/writer capable of reading data from, and writing data into, the IC card, the IC card reader/writer comprises a random number generator for generating a random number and a memory unit for storing the random number as an ID of the IC card. A switch used when the IC card is unloaded from the loader unit, activates the random number generator to generate a random number which is stored in the memory unit of the IC card, and the IC card lock controller locks the IC card which is then unloaded.

In an IC card lock system constituted by a combination of an IC card and an IC card reader/writer capable of reading data from, and writing data into, the IC card, the IC card reader/writer comprises verification means for verifying an ID entered from the input unit of the IC card reader/writer and an ID of the IC card reader/writer, a controller for unlocking the IC card reader/writer if the IDs verified by the verification means are judged to be verifiable, and means for reading the ID of the IC card. The IC card comprises verification means for verifying the ID read from the memory unit of the IC card reader/writer and an ID of the IC card stored in the memory unit of the IC card and a controller for unlocking the IC card.

(C) The memory unit of the IC card lock system described in (A) of (3) has IDs having a plurality of different priority orders. The IC card unlock controller of the IC card unlock system described in (B) of (2) has means for updating an ID of an IC card.

(4) The aspects of illegal action prevention of an electronic wallet system are given in the following in which money larger than a credit money value paid for one transaction is inhibited to be refunded.

(A) An electronic wallet system constituted by a combination of an IC card for storing electronic money information and an IC card reader/writer for reading data from, and writing data into, the IC card, comprises: credit means for supplying cash information from the IC card to the system; payment means for supplying cash information from the system to the IC card; and comparator means for comparing a credit money value supplied from the IC card to the system with a payment money value supplied from the system to the IC card, wherein after the credit means operates, the payment means is operated, and the credit means is controlled by a comparison result by the comparator means.

According to another aspect of the electronic wallet system, the system comprises means for storing a credit money value supplied to the system, an IC card load detector, and a control signal generator for initializing the credit means, payment means, comparator means, and the credit money value, wherein the IC card load detector activates the control signal generator and the payment means is activated if the comparator means judges that the payment money value is smaller than the credit money value.

(B) An electronic wallet system using an IC card for storing electronic money information, comprises: credit means for supplying cash information from a first IC card to a second IC card; payment means for supplying cash information from said second IC card to said first IC card; and comparator means for comparing a credit money amount supplied from the second IC card to the first IC card with a payment money value supplied from the second IC card to the first IC card, wherein after the credit means operates, the payment means is operated, and the payment means is controlled by the comparator means.

(5) In an electronic wallet system with an ID number specific to the system, having an IC card for storing electronic money information and an IC card reader/writer for reading data from, and writing data into, the IC card, the system comprises: IC card loader means for loading the IC card into, and unloading the IC card from, the IC card reader/writer; IC card load controller means for controlling a load/unload operation of the IC card; and an input unit for inputting data to the system, wherein the IC card is unloaded in response to an activation of an unload operation by the IC card load controller means and an input of the system ID from the input unit.

(6) In the system described in (5), the system includes an illegal code generator for generating an illegal code, and the IC card includes a memory unit for storing the illegal code, in response to an activation of an unload operation by said IC card load controller means and an input of IDs different from the system ID from the input unit, wherein the illegal code is generated and stored in the IC card which is then unloaded.

(7) In the system described in (6), the system further comprises communication means for automatically notifying a designated site of a detection of the illegal code, when the illegal code is generated by the illegal code generator.

(8) In the system described in (6), the illegal code is generated and stored in the IC card if the IC card is unloaded without using the IC card load controller means.

(9) In the system described in (5), the system further comprises a detector unit for detecting the illegal code from the IC card, and communication means for automatically notifying a designated site of a detection of the illegal code, when the illegal code is detected by the detector unit.

(10) In an electronic wallet system using an IC card for storing electronic money information, the system comprises: credit means for supplying cash information from a first IC card to a second IC card; payment means for supplying cash information from the second IC card to the first IC card; a controller unit for maintaining the normal state of the payment means refunding a payment money value from the second IC card to the first IC card; urgent means for inhibiting a normal operation of the controller during an urgent period; an illegal code generator unit responsive to the urgent means for generating an illegal code; a memory unit for storing the illegal code in the first IC card; and communication means responsive to a generation of the illegal code from the illegal code generator unit, for automatically notifying a predetermined site of the generation of the illegal code.

(11) In an electronic wallet system using an IC card for storing electronic money information, the system comprises: credit means for supplying cash information from a first IC card to a second IC card; payment means for supplying cash information from the second IC card to the first IC card; and comparison means for comparing a credit money value supplied from the second IC card to the first IC card with a payment money value supplied from the second IC card to the first IC card, wherein after the credit means operates, the payment means is operated, the payment means is controlled in accordance with a comparison result by the comparison means, the first and second IC cards have credit/payment histories, and in response to verification of the credit/payment histories of the first and second IC cards, the payment means is controlled.

(12) In an electronic wallet system having an IC card for storing electronic money information and an IC card reader/writer for reading data from, and writing data into, the IC card, the system comprises: credit means for supplying cash information from the IC card to the IC card reader/writer of the system; payment means for supplying cash information from the IC card reader/writer of the system to the IC card; and comparison means for comparing a credit money value supplied from the IC card to the IC card reader/writer of the system with a payment money value supplied from the IC card reader/writer of the system to the IC card, wherein after the credit means operates, the payment means is operated, the payment means is controlled in accordance with a comparison result by the comparison means, and in response to verification of a credit history of the IC card and a payment history of the IC card reader/writer of the system, the payment means is controlled.

The operations of the invention will be described next in correspondence with the above aspects (1–12) of the invention.

(Aspect 1) In this invention, when an IC card is unloaded from an IC card reader/writer, the IC card is automatically locked. When an IC card is loaded into an AC card reader/writer, it is automatically unlocked.

(Aspect 2) In this invention, security of the IC card unlock method described in the above (1) is improved such that only a register (IC card reader/writer) assigned to a register clerk can be used by the clerk.

(A) When an IC card is unlocked, three ID numbers of an IC card, an IC card reader/writer, and a user are verified to improve security.

When an ID is entered from the input unit of the IC card reader/writer, the verification means verifies whether the ID indicates a higher priority order manager. If it is the higher priority order (manager) ID, this fact is notified to CPU of the IC card. The verification means verifies the higher priority order (manager) ID entered from the input unit and an ID of an IC card of a higher priority order (manager) stored in the memory unit. If the IDs verified are judged to be verifiable, the IC card is unlocked by the IC card unlock controller.

(B) Two IDs of a user and an IC card reader/writer are verified to unlock the IC card reader/writer. The user can use only an IC card reader/writer assigned to the user.

(Aspect 3) In this invention, security of the IC card lock/unlock method described in the above (1) is improved by generating a random number at the same time when the IC card is locked and using the random number as an ID of the IC card.

(A) Even if an IC card is stolen and it is used at another IC card reader/writer, cash information in the IC card cannot be robbed because the ID of the IC card is generated by a random number and the other IC card reader/writer cannot know this password.

(B) For preventing vandalism by a user (register clerk) of an IC card reader/writer and making the electronic wallet system easy to use, a plurality of keys (passwords) are prepared for each IC card. A first lock of the IC card is released by a password of a higher priority order manager to discard the random number ID and allow the register clerk to use its ID. This ID of the register clerk releases a second lock of the IC card to use this card. In this manner, the electronic wallet system is improved in its security and made easy to use.

(Aspect 4) In this invention, illegal action prevention of an electronic wallet system is provided in which money larger than a credit money value paid for one transaction is inhibited to be refunded.

(A) In an electronic wallet system using an IC card, money larger than a credit money value paid for one transaction from the IC card to the register (IC card reader/writer) cannot be-refunded. Also a refundment is not permitted unless cash information is supplied from the IC card to the register. One transaction starts from loading the IC card into the register and ends at unloading the IC card from the register. With this arrangement, even if one register is used by a plurality of register clerks, vandalism of entering cash information of other users into their own IC cards can be prevented. At the midst of depositing money on a register (IC card reader/writer), money can be refunded to the IC card.

(Aspects 5–7) If an IC card storing transactions of a retail shop is illegally unloaded from the register, the register generates an illegal code to automatically record it in the IC card.

When an illegal code is generated from the register, this accident can be automatically notified to a police or the like.

An IC card recorded with an illegal code cannot be used thereafter (unable to receive and send cash information). When the illegal code of the IC card is detected at a register, this accident can be automatically notified to a police or the like. When an illegal code is generated, cash information and history in the IC card are stored in the memory unit of the register.

(Aspects 8–10) If cash information of an IC card storing transactions of a retail shop is illegally transferred to an IC card of a robber, this IC card is recorded with an illegal code, false cash information, and illegal code generation history. If the illegal code is thereafter detected, cash information of the IC card storing transactions of a retail shop cannot be transferred to the IC card of the robber.

When an illegal code is generated from the register, this accident can be automatically notified to a police or the like.

An IC card recorded with an illegal code cannot be used thereafter. When the illegal code of the IC card is detected at a register, this accident can be automatically notified to a police or the like.

(Aspects 11–12) Illegal action prevention is provided to make an electronic wallet system easy to use, in which money larger than a credit money value paid for one transaction to a register cannot be refunded.

In an electronic wallet system using an IC card, money larger than a credit money value paid for one transaction from the IC card to the register (IC card reader/writer) cannot be refunded. Also a refundment is not permitted unless cash information is supplied from the IC card to the register. One transaction starts from loading the IC card into the register and ends at unloading the IC card from the register. With this arrangement, even if one register is used by a plurality of register clerks, vandalism of entering cash information of other users into their own IC cards can be prevented. At the midst of depositing money on a register (IC card reader/writer), money can be refunded to the IC card.

With this method, the electronic wallet system is rather inconvenient since cash information cannot be refunded after some time lapses. To solve this, the histories stored in the IC card and the histories stored in the IC card are verified. If verifiable, a quasi state same as when a credit money value is supplied to the register is produced to allow a refundment to the IC card.

Other objects, features and advantages of the resent invention will become apparent from the following detailed description of the embodiments of the invention taken in conjunction with the accompanying drawings.

BRIEF DESCRIPTION OF THE DRAWINGS

FIGS. 6A to 6D are timing charts illustrating the operation of the electronic wallet system shown in FIG. 5.

DESCRIPTION OF THE PREFERRED EMBODIMENTS

Embodiments of the present invention will be described with reference to the accompanying drawings.

In this invention, when an IC card is pulled out of an IC card reader/writer, an IC card is automatically locked, and when the IC card is inserted into an IC card reader/writer, the IC card is automatically unlocked.

Various embodiments will be described with reference to FIGS. 1 to 6 in which an IC card reader/writer is provided with an IC card lock/unlock means.

Figure 1:
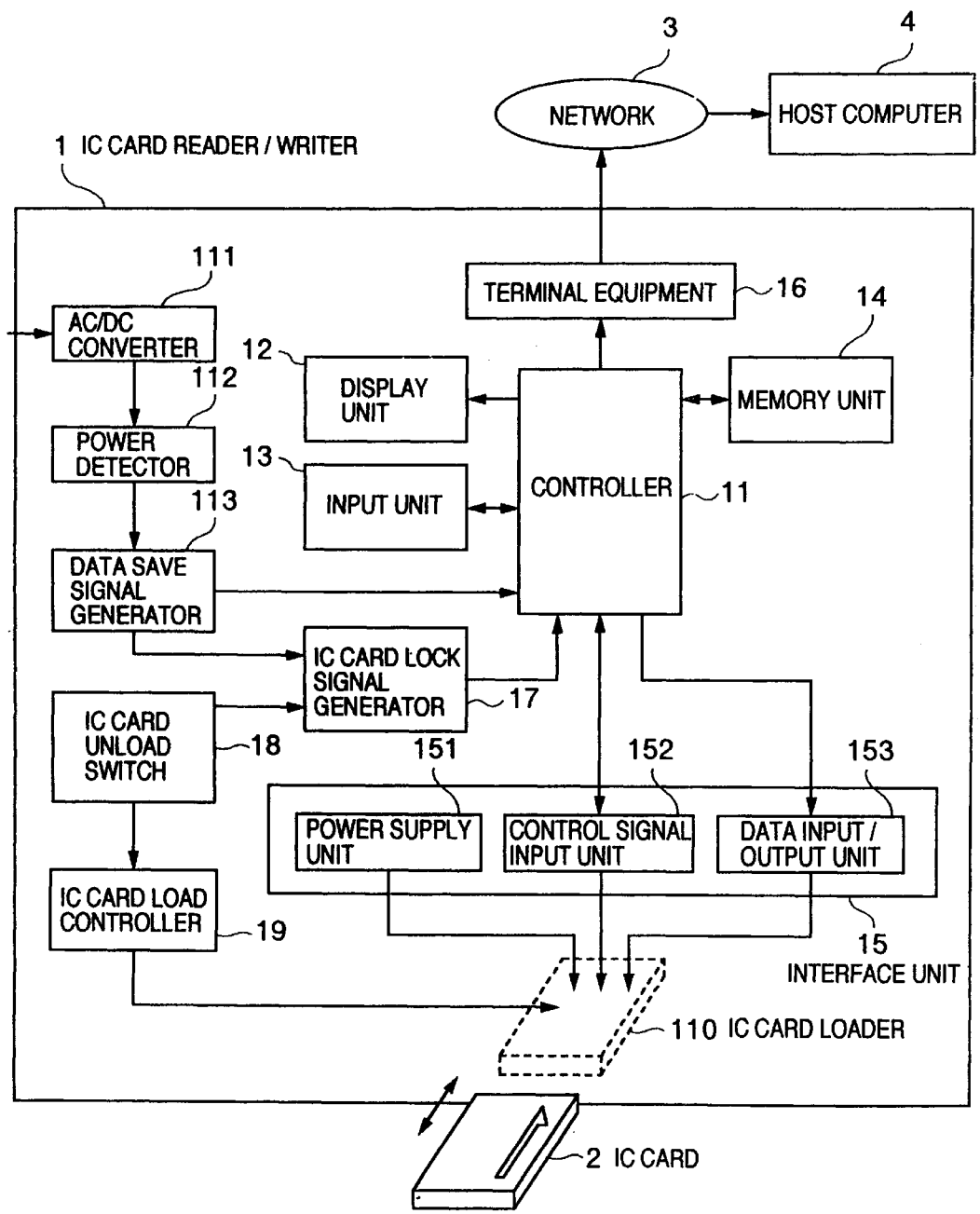
FIG. 1 shows in block form an embodiment of an electronic wallet system (with an IC card reader/writer having a function of locking an IC card), according to the invention.

FIG. 1 shows an embodiment of the invention in block form. In this embodiment, when an IC card 2 is pulled out of an IC card reader/writer 1, a control signal for locking the IC card 2 is generated by the IC card reader/writer 1 to automatically lock the IC card 2.

Figure 2:
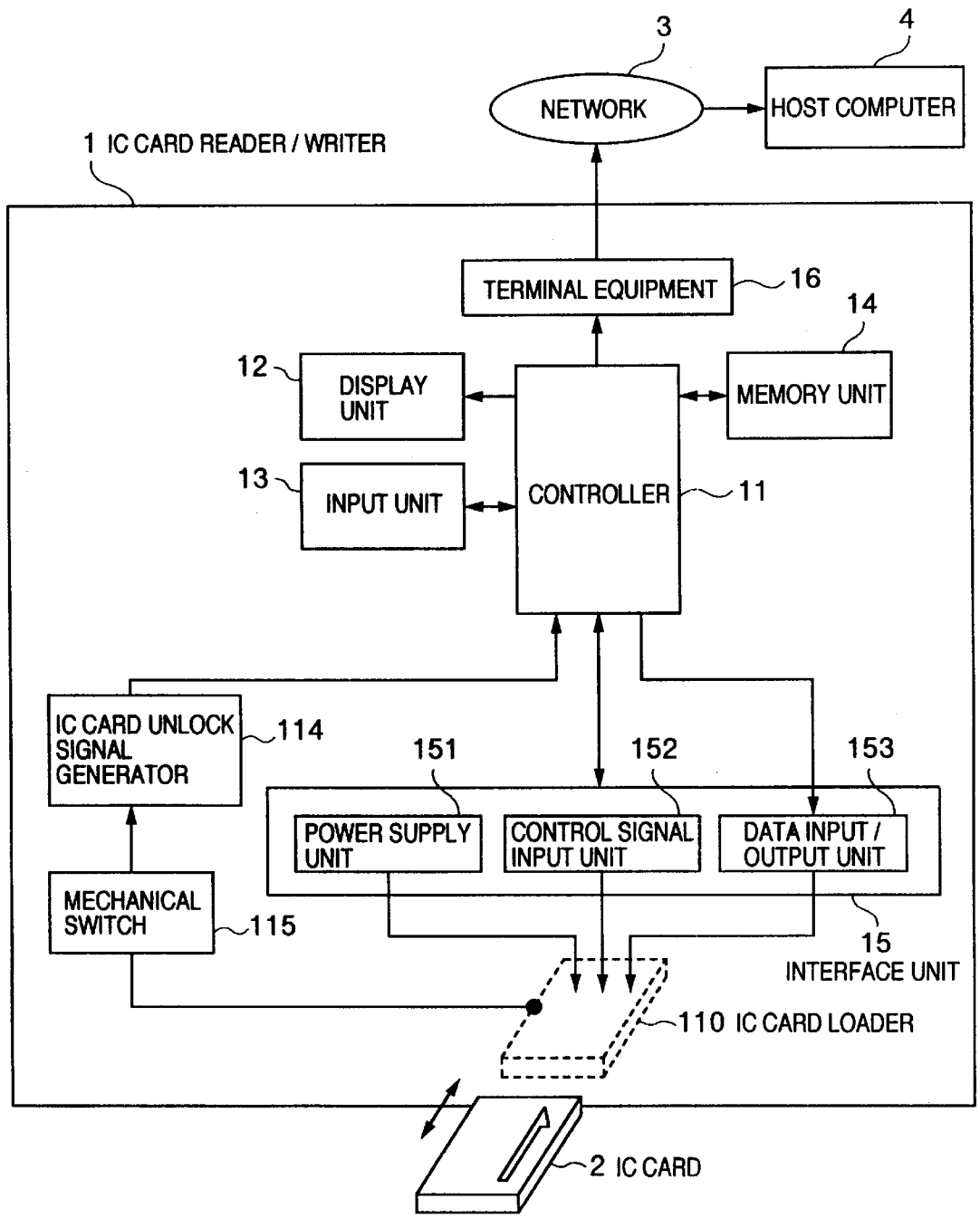
FIG. 2 is a block diagram showing an embodiment of IC card unlock for the electronic wallet system shown in FIG. 1.
Figure 3:
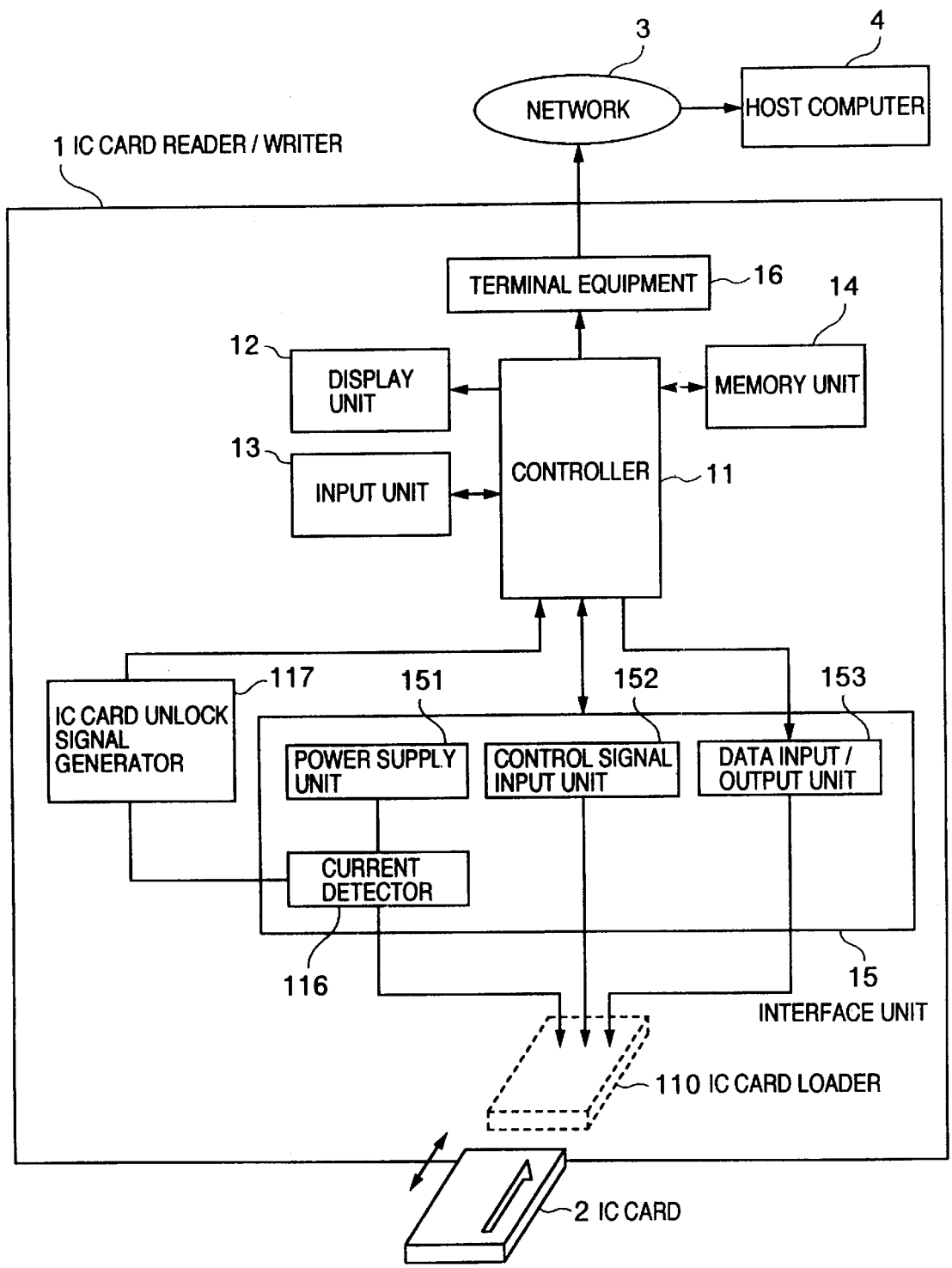
FIG. 3 is a block diagram showing another embodiment of IC card unlock for the electronic wallet system shown in FIG. 1.
Figure 4:
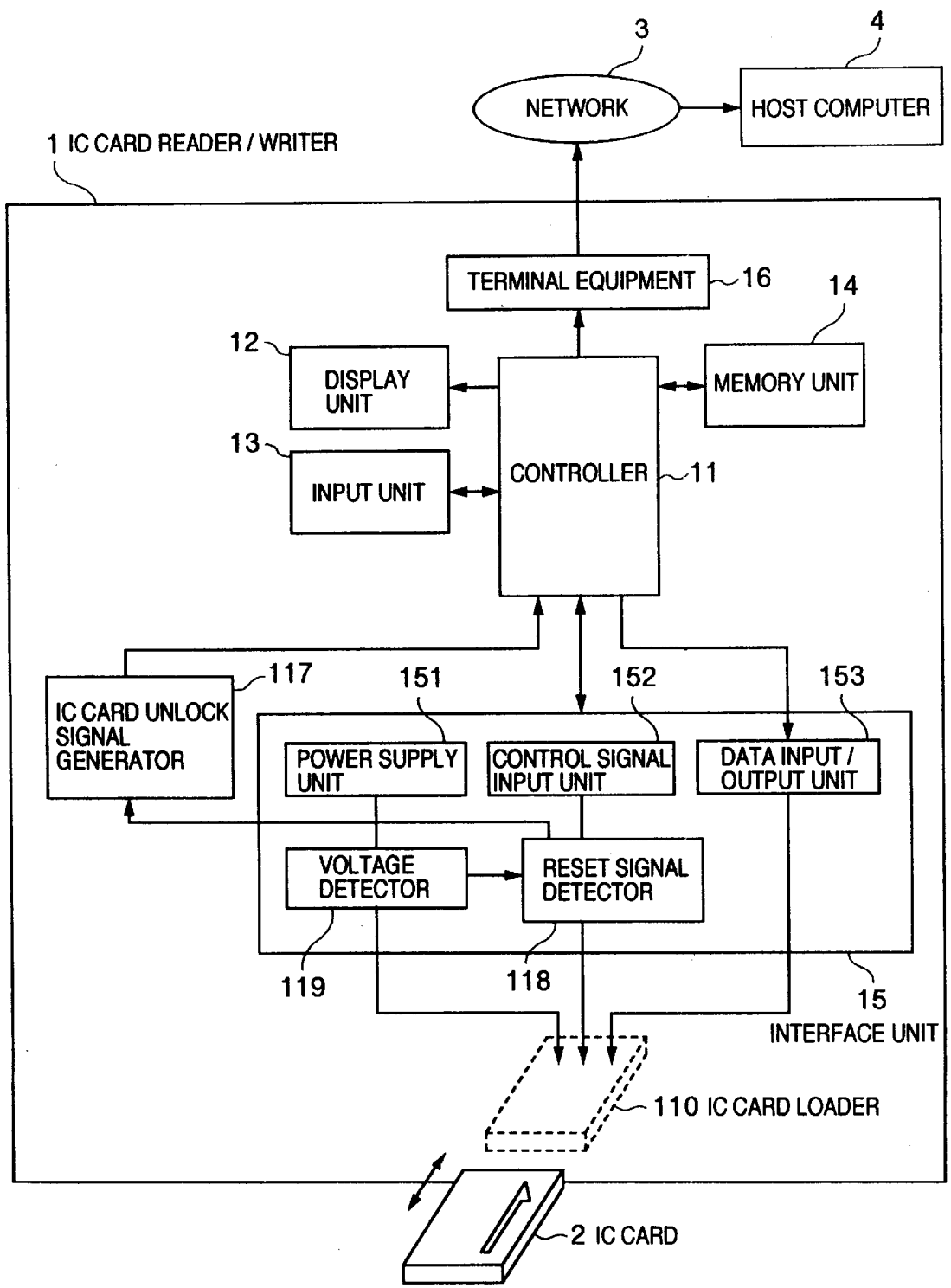
FIG. 4 is a block diagram showing a further embodiment of IC card unlock for the electronic wallet system shown in FIG. 1.

FIGS. 2 to 4 show other embodiments of the invention. In these embodiments, when an IC card 2 is inserted into an IC card reader/writer 1, a control signal for unlocking the IC card 2 is generated by the IC card reader/writer 1 to automatically unlock the IC card 2.

Referring to FIG. 1, reference numeral 1 represents an IC card reader/writer, reference numeral 2 represents an IC card, reference numeral 3 represents a network, reference numeral 4 represents a host computer, reference numeral 11 represents a controller, reference numeral 12 represents a screen of a display unit such as a monitor, reference numeral 13 represents an input unit such as a keyboard and a bar code reader, and reference numeral 14 represents a memory unit. An interface unit 15 includes terminals 151 for supplying a power to an IC card, terminals 152 for supplying control signals such as clocks and a reset signal to the IC card, and terminals 153 for data transfer between the IC card and the IC card reader/writer. A terminal equipment 16 may be any one of a personal computer, a POS terminal, an ATM, a handy terminal, a telephone terminal, a gate terminal, an automatic dispenser terminal, and the like. Reference numeral 17 represents an IC card lock controller, reference numeral 18 represents an IC card unload switch, reference numeral 19 represents an IC card load controller, reference numeral 110 represents an IC card loader, reference numeral 111 represents an AC/DC converter, reference numeral 112 represents a power detector, and reference numeral 113 represents a data save signal generator.

In operation, the controller 11 controls the blocks 12, 13, 14, 15, and 16 of the IC card reader/writer 1. Data from the terminal equipment 16 is supplied via the network 3 to the host computer 4 and processed by the computer 4. The IC card is placed on the loader 110 such as an IC card tray or slot of the IC card reader/writer 1. When the user pushes the IC card unload switch 18 to pull the IC card out of the reader/writer 1, the IC card lock controller 17 generates an IC card lock control signal which is supplied via the controller 11 and the data input/output unit 153 of the interface unit 15, to the IC card 2 to lock it. At the same time, the IC card load controller 19 operates to allow the user to pull the IC card out of the IC card loader 110.

Even if power interruption occurs, similar to the depression of the IC card unload switch, it is possible to lock the IC card 2 and unload it from the IC card reader/writer 1. Specifically, although the in-circuit power sources for the display unit 11 and input unit 13 lower as the power supply lowers, the in-circuit power sources for the controller 11, memory unit 14, interface unit 15, and other necessary blocks have auxiliary batteries or large capacitors so that even if the power supply is interrupted, the in-circuit power sources lower gently. The AC/DC converter 111 converts an a.c. voltage into a d.c. voltage. The power detector detects whether a predetermined voltage is being supplied.

When the predetermined voltage cannot be obtained, the data save signal generator 113 supplies a signal to the controller 11 to save the data in the IC card 2 and IC card reader/writer 1 for preventing destruction of the data. The IC card lock controller 17 generates an IC card control signal which is supplied via the controller 11 and the data input/output unit 153 of the interface unit 15 to the IC card 2 to lock it. The IC card load controller 19 controls to permit unloading the IC card 2 from the IC card loader 110. As described earlier, although the in-circuit power sources for the display unit 11 and input unit 13 lower as the power supply lowers, the in-circuit power sources for the controller 11, memory unit 14, interface unit 15, IC card loader 110, and other necessary blocks have auxiliary batteries or large capacitors so that even if the power supply is interrupted, the in-circuit power sources lower gently. Therefore, it is possible to save data, lock the IC card 2, and unload the IC card 2 from the IC card loader 110.

A method of automatically unlocking the IC card will be described, this method being used in combination with the IC card locking method described above and making the IC card reader/writer easy to use.

FIG. 2 shows another embodiment of the invention in block form. In this embodiment, when an IC card 2 is loaded into an IC card reader/writer 1, a control signal for unlocking the IC card 2 is generated by the IC card reader/writer 1 to automatically unlock the IC card 2. A mechanical switch 115 is mounted on the IC card loader 110. When the IC card 2 is correctly loaded, the switch 115 turns on so that the IC card unlock controller 114 generates a control signal for unlocking the IC card 2. This control signal is supplied via the controller 11 and the data input/output unit 153 of the interface unit 15 to the IC card to automatically unlock it.

FIG. 3 shows another embodiment of the invention in block form. In this embodiment, when an IC card 2 is loaded into an IC card reader/writer 1, a control signal for unlocking the IC card 2 is generated by the IC card reader/writer 1 to automatically unlock the IC card 2. A current detector 116 is connected to the power supply terminals 151 of the interface unit 15, the current detector 116 detects the amplitude of current supplied to the IC card 1. When the IC card 2 is correctly loaded into the IC card loader 110, power is supplied to the IC card 2 from the power supply unit 151 to flow a predetermined quantity of current. As the current detector 116 detects this predetermined quantity of current, the IC card unlock controller 117 generates a control signal for unlocking the IC card 2. This control signal is supplied via the controller 11 and the data input/output unit 153 of the interface unit 15 to the IC card 2 to automatically unlock it.

FIG. 4 shows another embodiment of the invention in block form. In this embodiment, when an IC card 2 is loaded into an IC card reader/writer 1, a control signal for unlocking the IC card 2 is generated by the IC card reader/writer 1 to automatically unlock the IC card 2. A reset signal detector 118 is connected to the terminals 152 of the interface unit 15, the terminals 152 being used for inputting clocks, a reset signal, and the like. When the IC card 2 is correctly loaded into the IC card loader 110, power is supplied to the IC card 2 from the power supply unit 151 and the reset signal is supplied from the control signal input unit 152. When the reset signal is inputted, all the operations of the IC card 2 except clock oscillation are temporarily stopped so as not to operate the IC card 2 under an unstable condition of in-circuits of the IC card 2. Input of the reset signal also provides a function of setting initial values to the circuits used by a microcomputer in the IC card 1 (the microcomputer (CPU) of the IC card 2 will be later described with reference to FIG. 5). After the voltage detector 119 recognizes that the in-circuits of the IC card 1 have been stabilized and the reset signal detector 118 detects that the reset signal has been input to the IC card 2, the IC card unlock controller 117 generates a control signal for unlocking the IC card 2. This control signal is supplied via the controller 11 and the data input/output unit 153 of the interface unit 15 to the IC card 2 to automatically unlock it.

Another embodiment will be described in which an IC card is provided with an IC card lock/unlock means.

Figure 5:
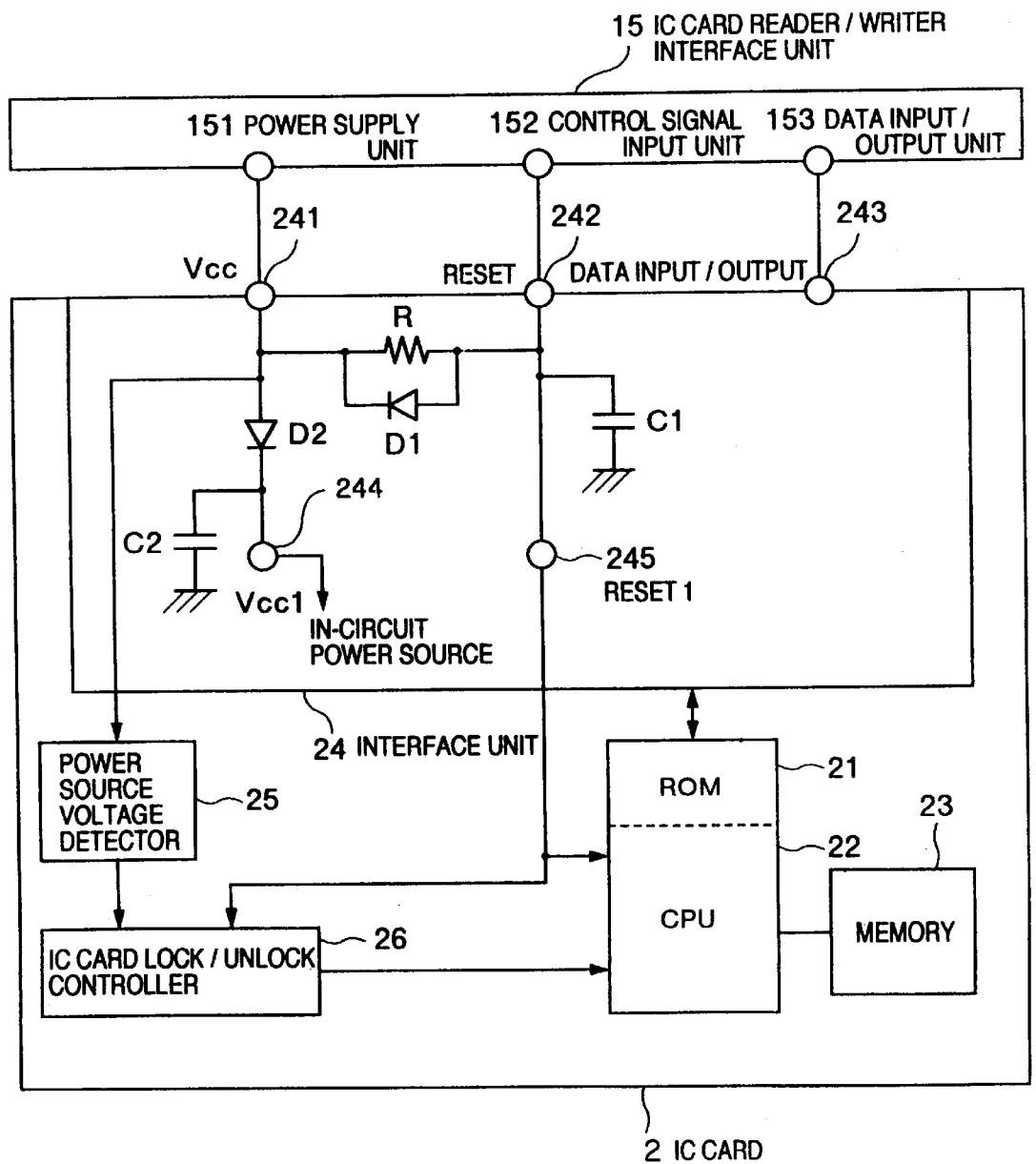
FIG. 5 shows in block form an embodiment of an electronic wallet system (with a function of locking an IC card), according to the invention.

FIG. 5 shows an embodiment of the invention in block form. In this embodiment, when an IC card 2 is pulled out of an IC card reader/writer 1, a control signal for locking the IC card 2 is generated by the IC card 2 to automatically lock the IC card 2. Conversely, when an IC card 2 is loaded into the IC card reader/writer 1, a control signal for unlocking the IC card 2 is generated by the IC card 2 to automatically unlock the IC card 2. The IC card 2 includes a ROM unit 21, a CPU (central processing unit) 22, a memory unit 23, and an interface unit 24. Data in the memory unit 23 is transferred to and from the interface unit 15 of the IC card reader/writer 1 via the interface unit 24 and CPU 11.

A DATA INPUT/OUTPUT terminal 243 of the IC card is connected with a DATA INPUT/OUTPUT terminal 153 of the interface unit 15 to transfer data therebetween. This is the same in FIGS. 14 and 18.

FIGS. 6A to 6D show simplified timing charts. FIG. 6A shows a power supply voltage 241 supplied from he IC card reader/writer 1. FIG. 6B shows an in-circuit power source voltage 244 used by the in-circuits of the IC card 2. FIG. 6C shows a detected voltage of a reset signal 245. FIG. 6D shows a signal generated by an IC card lock/unlock controller 26.

In a reset circuit for generating the reset signal 245, a reset input 242 gently rises with a time constant determined by a capacitor C1 and a resistor R after power-on. After several seconds after the power-on, CPU 22 judges that the reset input is high level and starts executing a program stored in the RON unit 21. Upon power-off, charges in the capacitor C1 are discharged quickly through a diode D1.

As shown in the timing charts of FIGS. 6A to 6D, the low level of the reset 1 signal 245 is generally detected at a voltage of about 0.2 VR (VR in FIG. 6C). As in the case of instantaneous power interruption, if the in-circuit power source voltage of the IC card 2 becomes lower than the rated operation voltage and immediately thereafter the power supply is recovered, then the reset signal cannot be input as indicated by a broken line in FIG. 6C and CPU 22 runs out of order. To solve this, the in-circuit power source voltage 244 is made slower in lowering its voltage than the power supply voltage 241 to the IC card, by using the capacitor C2 and diode D2.

The power source voltage detector 25 detects the level of the power supply 241 to the IC card. When Vcc shown in FIG. 6A becomes equal to or lower than a predetermined voltage detection level at (2) shown in FIG. 6D, the reset signal is set to the low level and the IC card lock/unlock controller 26 turns on the lock control signal to lock the IC card 2. When Vcc shown in FIG. 6A becomes larger than the predetermined voltage detection level at (3) and when it is recognized that the reset signal has been inputted (changed from the low level to the high level) at (4), the lock control signal is turned off to release the lock of the IC card 2.

Another embodiment of a lock/unlock controller of an IC card will be described in which data transfer between the IC card reader/writer and the IC card is performed in a non-contact way.

Figure 7:
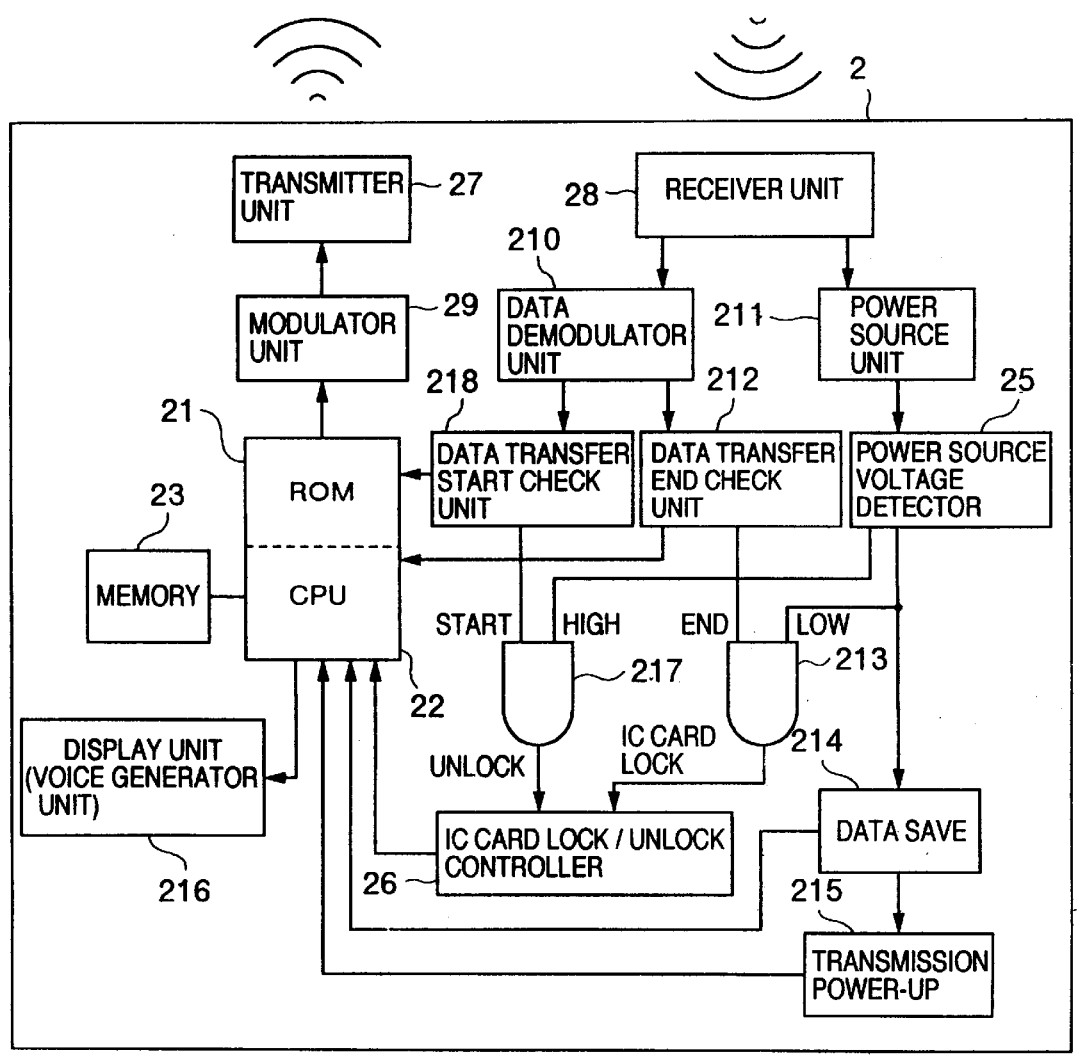
FIG. 7 shows in block form an embodiment of an electronic wallet system with a non-contact type IC card, according to the invention.

FIG. 7 shows an embodiment of the invention in block form. This embodiment provides a lock/unlock method for an IC card of the type (non-contact type) that data is transferred in a non-contact way between an IC card reader/writer and the IC card while power is supplied externally to the IC card. If the IC card 2 is at a position remote from the IC card reader/writer 1 by a predetermined distance, a signal for locking the IC card 1 is supplied to automatically lock it. Conversely, if an IC card 2 is at a position nearer to the IC card reader/writer 1 within the predetermined distance, a signal for unlocking the IC card 1 is supplied to automatically unlock it.

First, a lock method for an IC card of a non-contact type will be described. Data can be transmitted in a non-contact way through electromagnetic coupling, electromagnetic induction, microwave communications, optical communications, and the like. In transmitting data from the IC card, a CPU 22 controls a modulator unit 29 by using a ROM 21, and the modulated signal is transmitted via a transmitter unit 27 to the IC card reader/writer 1. Data and other signals transmitted from the IC card reader/writer 1 are received by a receiver unit 28 and demodulated by a data demodulator 210. Power externally supplied to the IC card of the non-contact type can be received through electromagnetic induction or other means. A power supply unit 211 generates an in-circuit power source for the IC card 2, a power source voltage detector 25 detects whether a predetermined power source voltage is obtained. If not, a data save signal 214 is supplied to CPU 22 and an instruction of raising transmission power is supplied to CPU 11 from a transmission power-up unit 215. A notice of a lowered power source voltage is displayed on a display unit 216, or may be given by voices. A data transfer end check unit 212 is provided for checking whether a data transfer has been completed, and a data transfer end notice can be displayed on the display unit 216. After it is confirmed that the in-circuit power source voltage of the IC card 2 has been lowered and that the data transfer end check unit 212 indicates a data transfer end, an IC card lock/unlock controller 26 locks the IC card 2.

Next, an unlock method for the IC card of a non-contact type will be described. A data transfer start check unit 218 detects a signal representative of a data transfer start (this signal may be replaced by the reset signal) and the power source voltage detector 25 recognizes that the voltage is higher than the predetermined power source voltage. Thereafter, the IC card lock/unlock unit 26 unlocks the IC card. A data transfer notice is displayed on the display unit 216.

Figure 8:
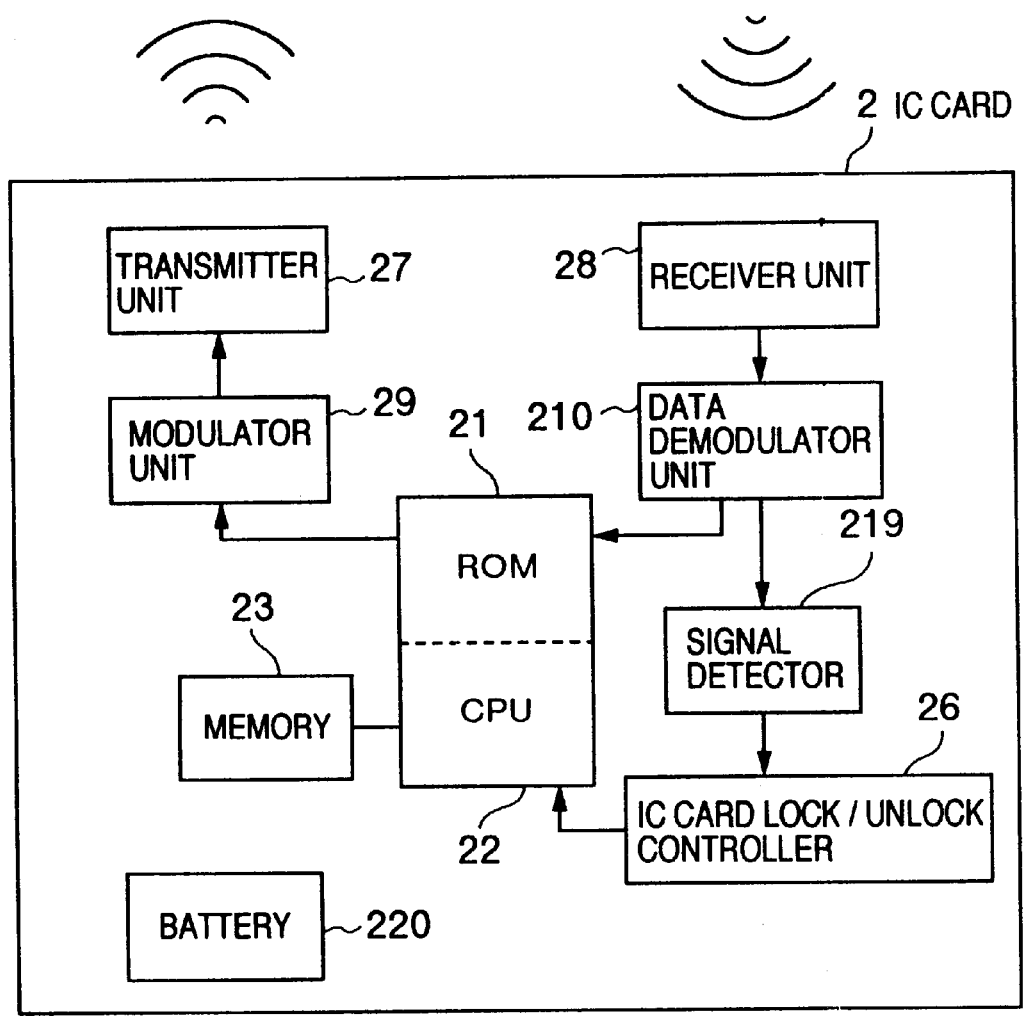
FIGS. 8 shows in block form an embodiment of an electronic wallet system with a non-contact type IC card having a built-in battery, according to the invention.

FIG. 8 shows an embodiment of the invention in block form. In this embodiment, when an IC card 2 of a non-contact type externally supplied with power is at a position remote from an IC card reader/writer by a predetermined distance, a signal detector 219 detects that there is no signal and an IC card lock/unlock controller 26 supplies a lock control signal to the IC card 2 to automatically lock it. In releasing the lock state, when the signal detector 219 detects that there is a signal, the IC card lock/unlock controller 26 supplies an unlock control signal to the IC card 2 to automatically unlock it. In the memory unit 14, a manager ID 142 for managing the IC card read/writer 1 is stored. A battery 220 supplies power to respective constituent elements within IC card 2.

Next, another embodiment will be described in which the IC card unlock method is improved in security.

Figure 9:
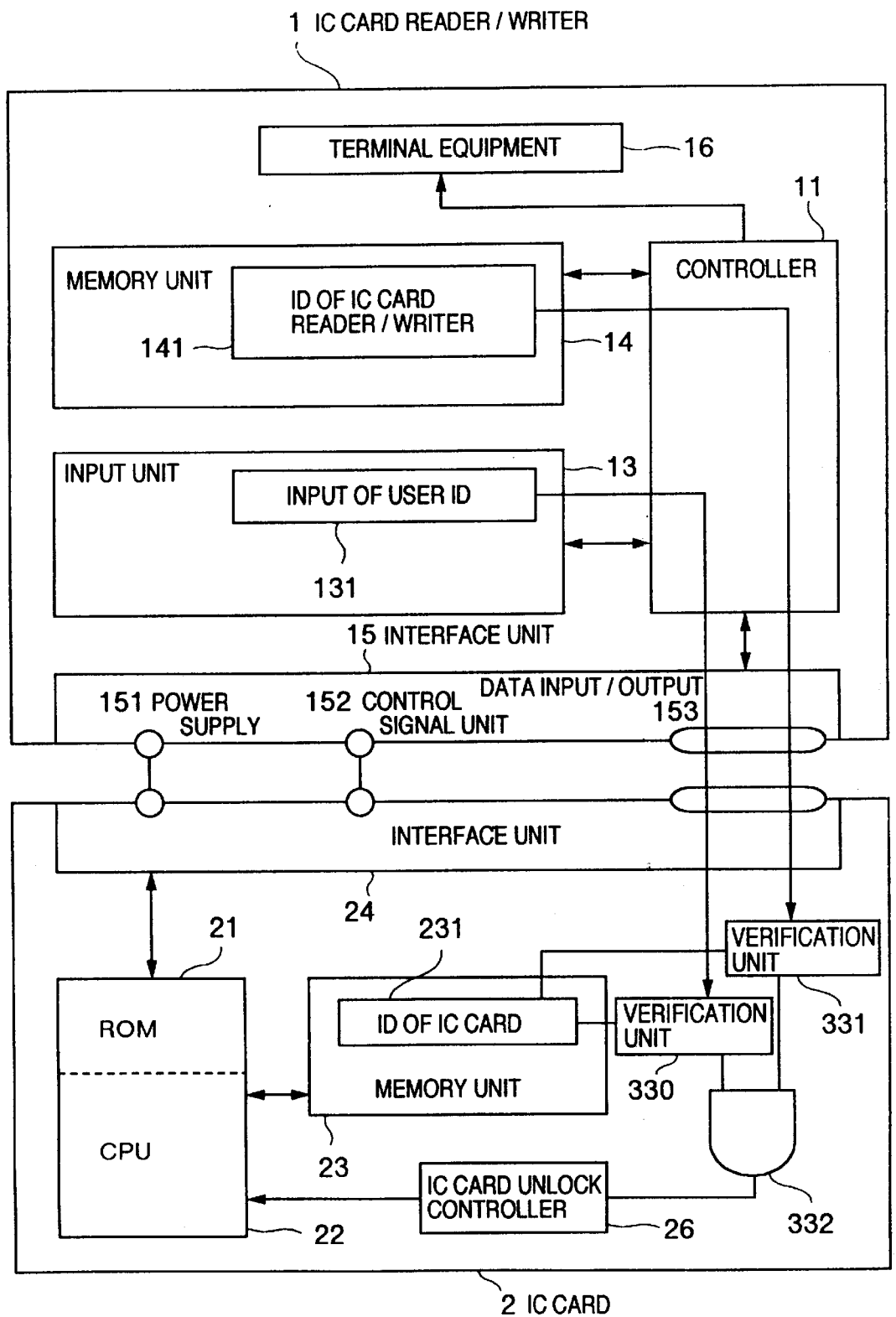
FIG. 9 shows in block form an embodiment of an electronic wallet system, according to the invention.

FIG. 9 shows an embodiment of the invention in block form. In this embodiment, in order to ensure security, three IDs of a user, an IC card reader/writer, and an IC card are verified to unlock the IC card. After the three IDs are verified, the IC card is unlocked. The user is permitted to use only the IC card reader/writer assigned to the user. In locking the IC card, as described with FIG. 1, the IC card 2 is unloaded from the IC card reader/writer 1, and the IC card reader/writer 1 generates an IC card lock control signal to automatically lock the IC card 2.

An unlock method illustrated in FIG. 10 will be described. When an IC card 2 is loaded into an IC card reader/writer 1 and a user ID 131 is input from an input unit 13, a verification unit 330 compares, via a controller 11, this user ID with an ID stored in the memory unit 23 of the IC card 2. Verification units 330 and 331 verify an ID 141 of the IC card reader/writer 1 stored in a memory unit 14 of the IC card reader/writer 1, and an ID 231 of the IC card 2 stored in the memory unit 23 of the IC card. If the verification units verify that both the IDs are correct or verifiable, an IC card lock controller 26 unlocks the IC card 2 via CPU 22. Numeral 332 denotes an and circuit.

Figure 10:
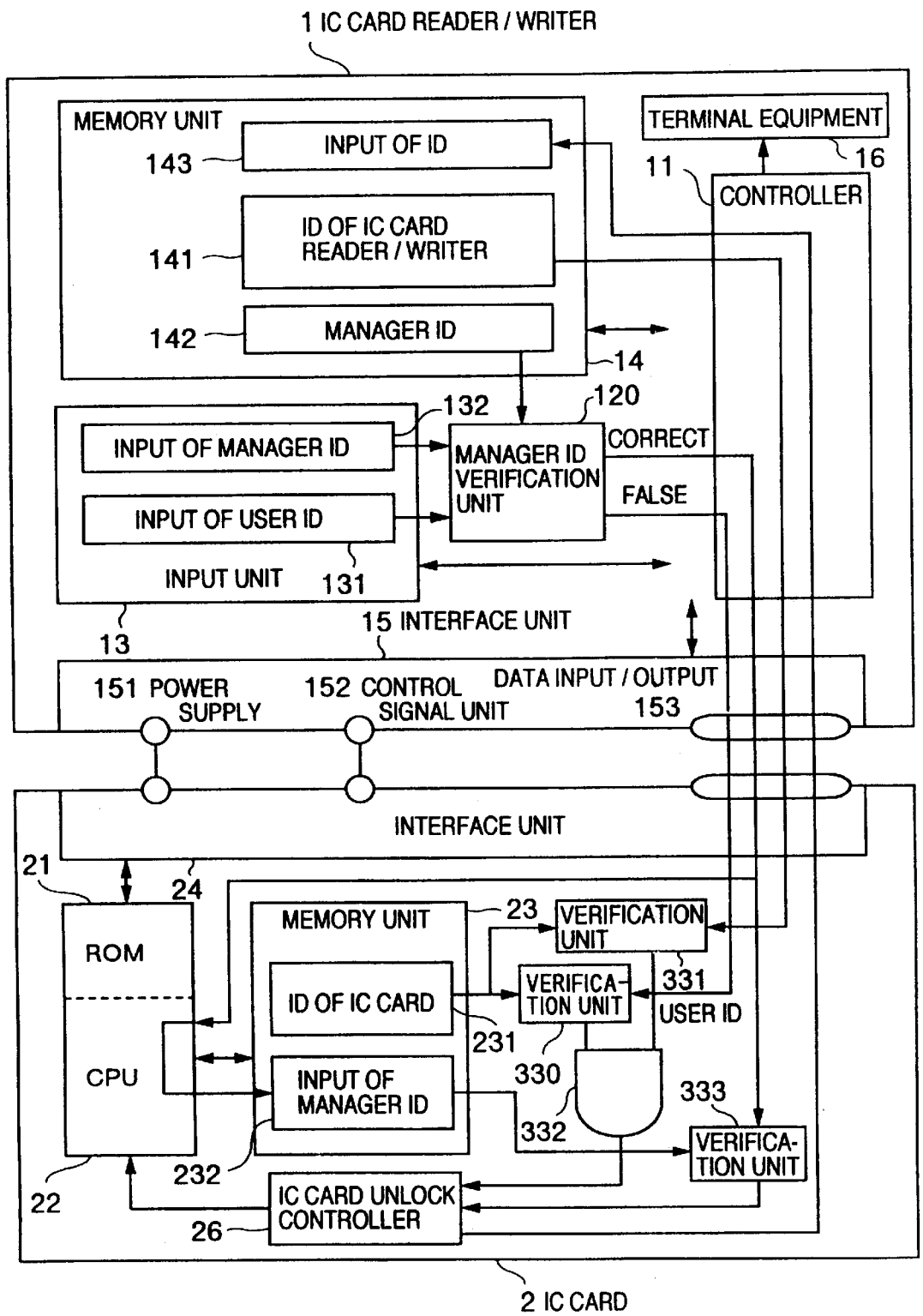
FIGS. 10 to 14 show in block form other embodiments of an electronic wallet system, according to the invention.
Figure 11:
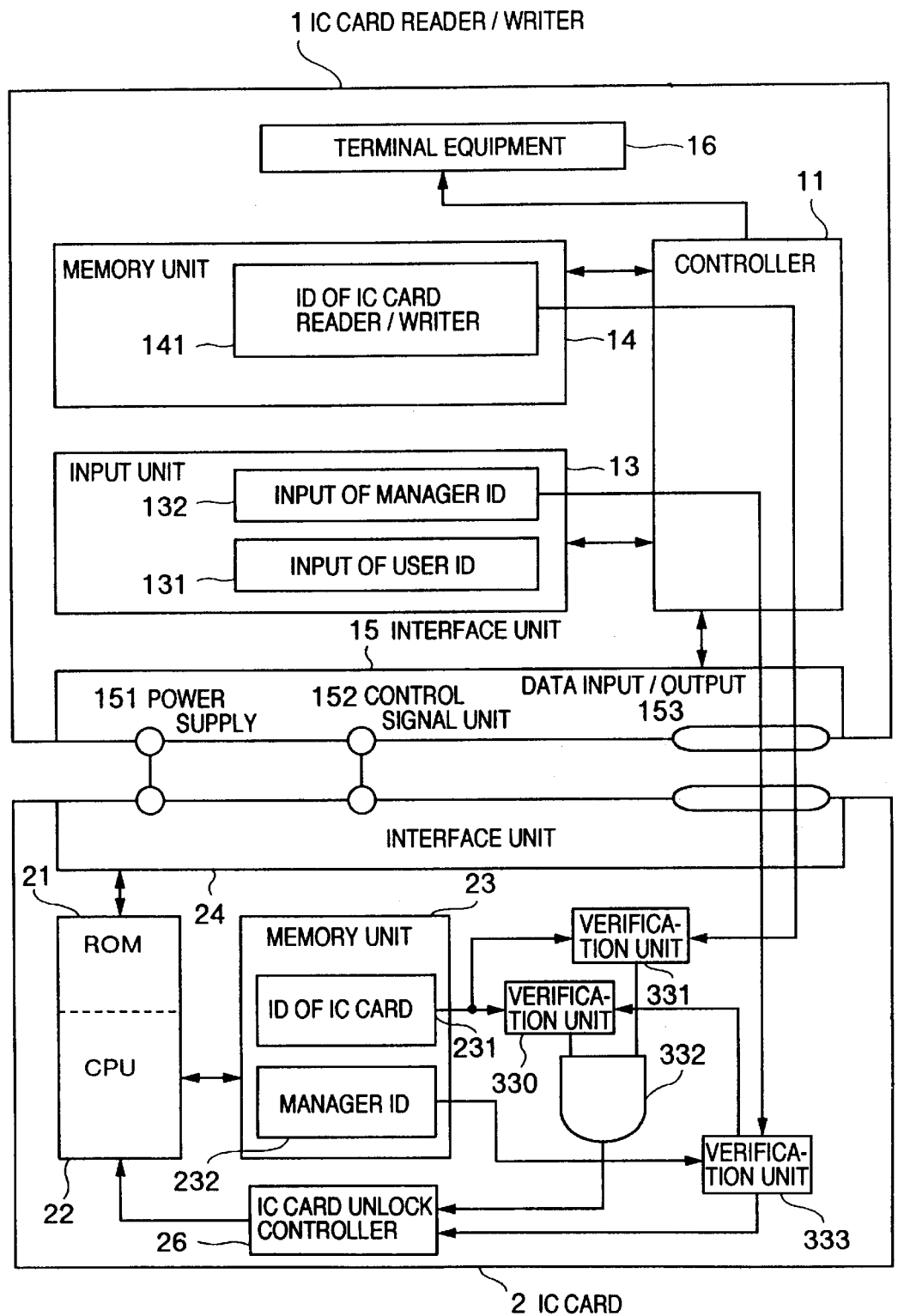
Figure 12:
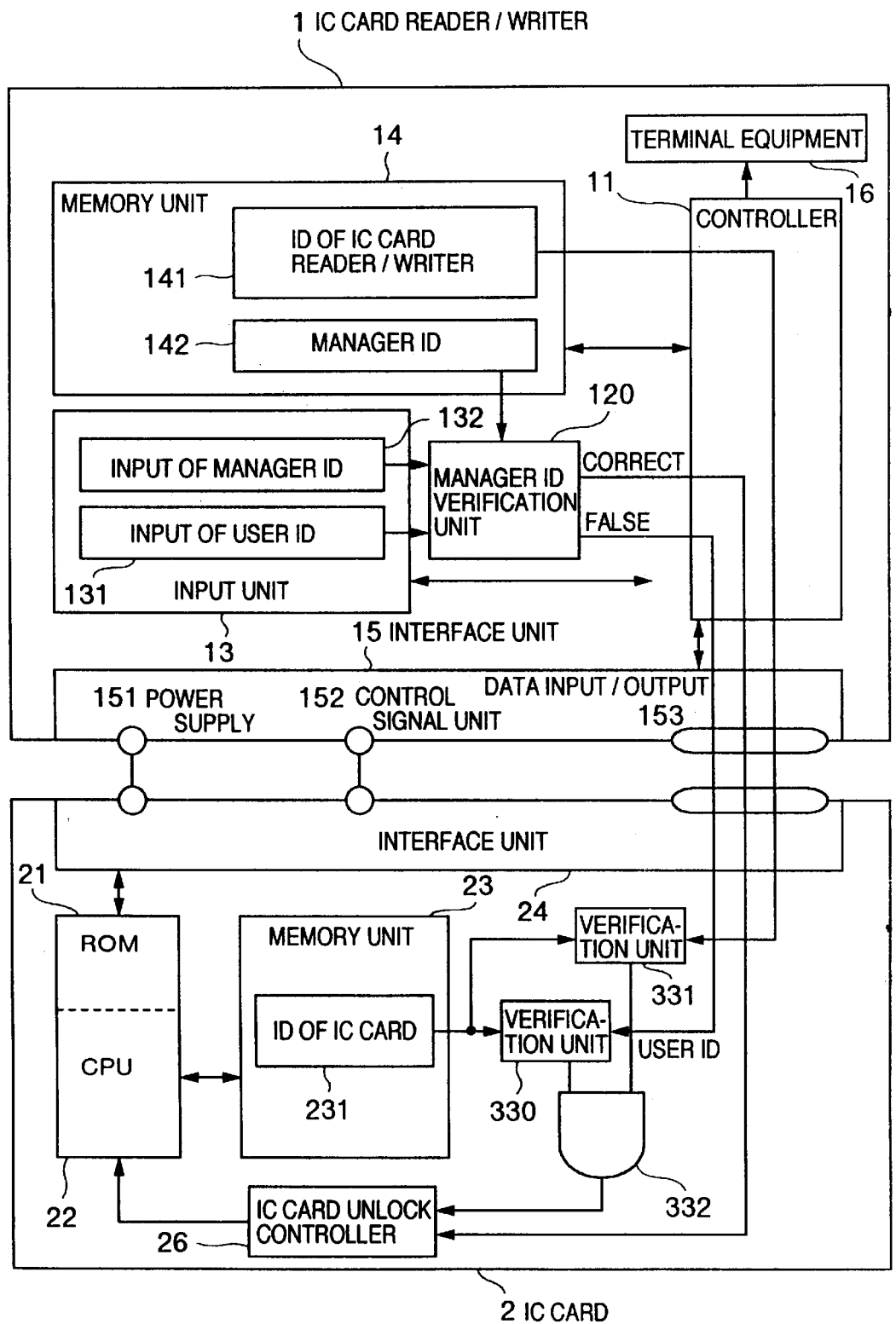

FIGS. 10 to 12 show an embodiment of this invention in block form. In the embodiment shown in FIG. 9, the user can use only the IC card reader/writer assigned to the user. In the embodiment shown in FIGS. 10 to 12, the user can use the IC card at a plurality of IC card readers/writers allowed by a manager. This embodiment makes a manager easy to use the IC card reader/writer.

When a manager ID is input from the input unit 13 of the IC card reader/writer 1, a manager ID verification unit 120 verifies whether the manager has a high priority order. If a high priority order manager ID, CPU 22 of the IC card 1 is notified of the high priority order manager ID. A verification unit 333 verifies whether a high priority order manager ID 232 stored in the memory unit 23 matches the high priority order manager ID 132 entered from the input unit 13. If verifiable, the IC card unlock controller 26 unlocks the IC card. In the memory unit 14, a manager ID 142 for managing the IC card read/writer 1 is stored.

In this embodiment, both the IC card reader/writer and the IC card store the manager ID, and are provided with the manager ID verification unit. As an alternative embodiment, only the IC card reader/writer may store the manager ID and be provided with the manager ID verification unit. Also in this case, if the manager ID is verified, the IC card is unlocked.

Similarly,. only the IC card may store the manager ID and be provided with the manager ID verification unit.

Figure 13:
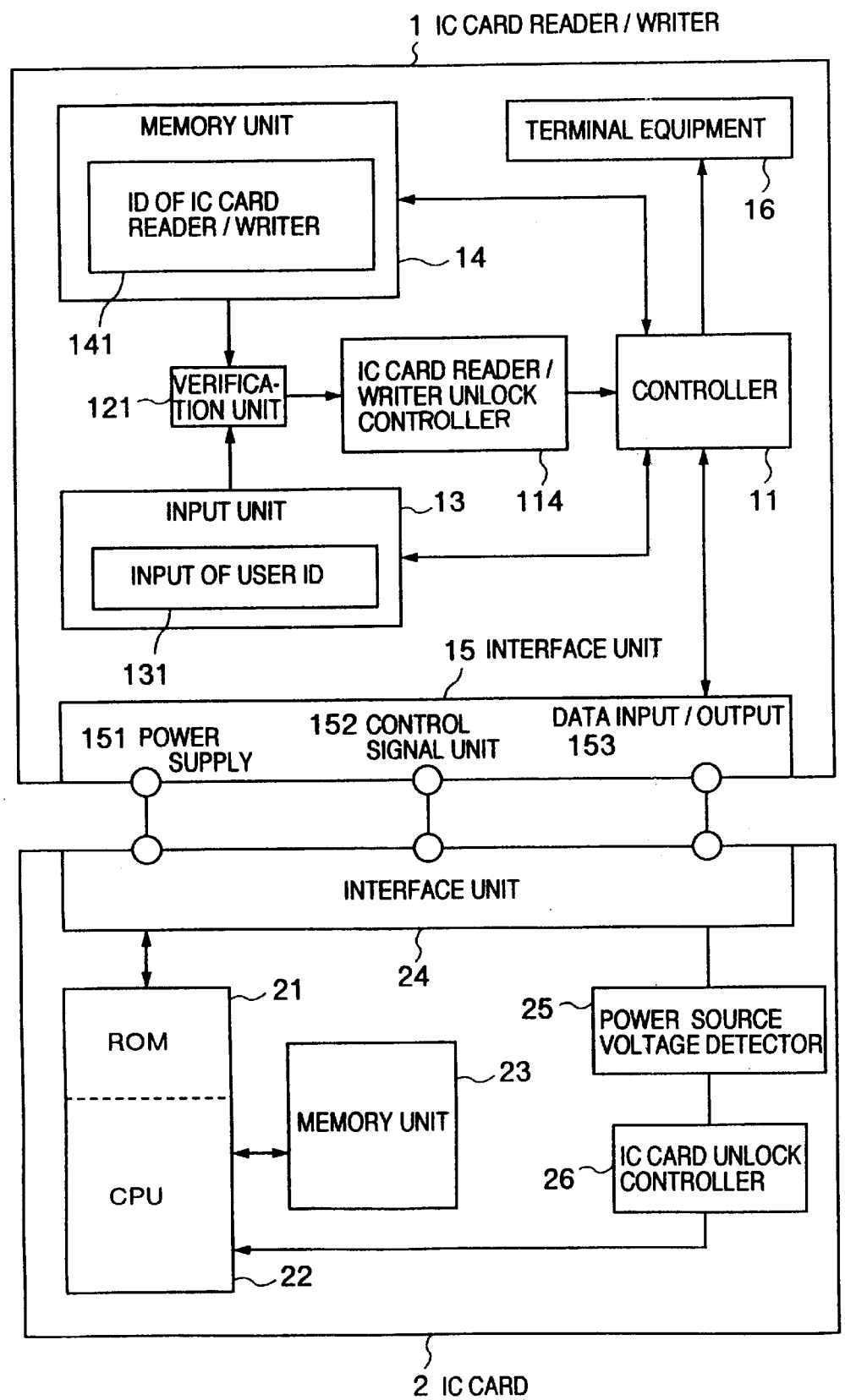

FIG. 13 shows another embodiment of the invention in block form. In this embodiment, as shown in FIG. 1, when an IC card 2 is pulled out of an IC card reader/writer 1, a control signal for locking the IC card 2 is generated by the IC card reader/writer 1 to automatically lock the IC card 2. Conversely, as shown in FIG. 2, when an IC card 2 is inserted into an IC card reader/writer 1, a control signal for unlocking the IC card 2 is generated by the IC card reader/writer 1 to automatically unlock the IC card 2.

In the embodiment shown in FIG. 13, in order to ensure security, two IDs of the user and IC card reader/writer are verified before unlocking the IC card reader/writer 1. The user can use only the IC card reader/writer assigned to the user. When a user ID is entered from the input unit 13, a verification unit 121 verifies an ID of the IC card reader/writer 1 stored in the memory unit 14. If verifiable, an IC card reader/writer unlock controller 114 outputs an unlock control signal to the controller 11 to unlock the IC card reader/writer 1. After the IC card is unlocked, the user ID entered from the input unit 13 is stored in the memory unit 14 of the IC card reader/writer 1. Therefore, a history of users of the IC card reader/writer can be known.

Next, a system will be described in which the IC card lock/unlock method is improved in security. In this system, at the same time when the IC card is locked, a random number is generated to use it as an ID of the IC card.

Figure 14:
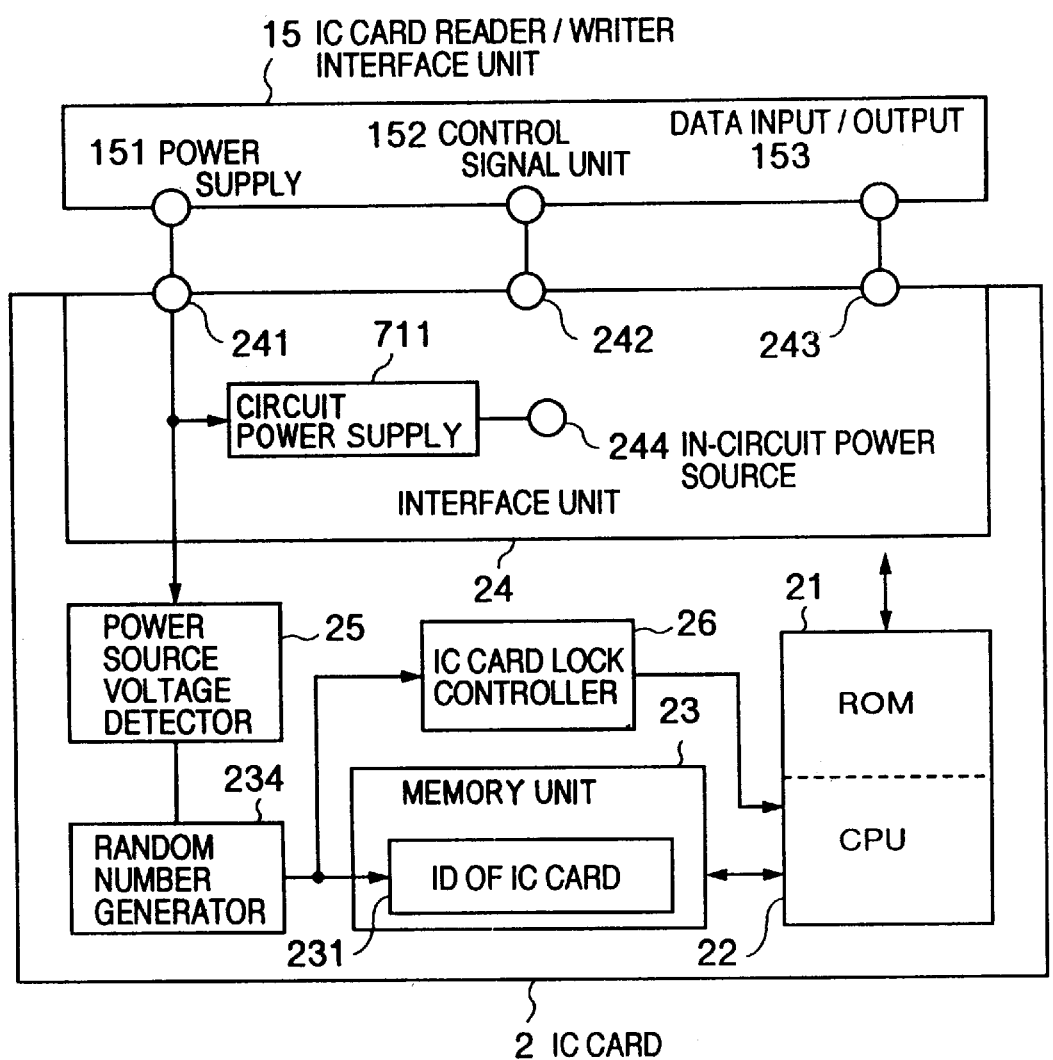

FIG. 14 shows another embodiment of the invention in block form. When an IC card is unloaded from the IC card reader/writer 1, a random number is generated in the IC card 2 and a lock control signal is output to automatically lock the IC card. An unlock method is illustrated in FIG. 14. In order to enhance security, the IC card reader/writer 1 is unlocked after two IDs of the user and the IC card reader/writer 1 are verified. When the IC card reader/writer 1 is unlocked, it outputs an unlock control signal to the IC card 2 to also automatically unlock the IC card 2. A user (register clerk) can use only the IC card reader/writer 1 assigned to the user.

First, the lock method for the IC card 2 illustrated in FIG. 14 will be described. When the IC card 2 is unloaded from the IC card reader/writer 1, power supply from the power supply terminals 151 of the interface unit 15 to the IC card 2 is stopped. The IC card 2 is provided with an in-circuit power supply 711 which lowers an in-circuit power source voltage 244 slower than the power supply voltage at 241 of the IC card 2. Similar to the embodiment shown in FIG. 5, when the power source voltage detector 25 detects that the voltage becomes equal to or lower than a predetermined voltage, a random number generator 234 generates a random number. This random number is registered in the memory unit 23 as an ID 231 of the IC card 2. Thereafter, the IC card lock controller 26 outputs a lock control signal to CPU 22 to lock the IC card 2.

Figure 15:
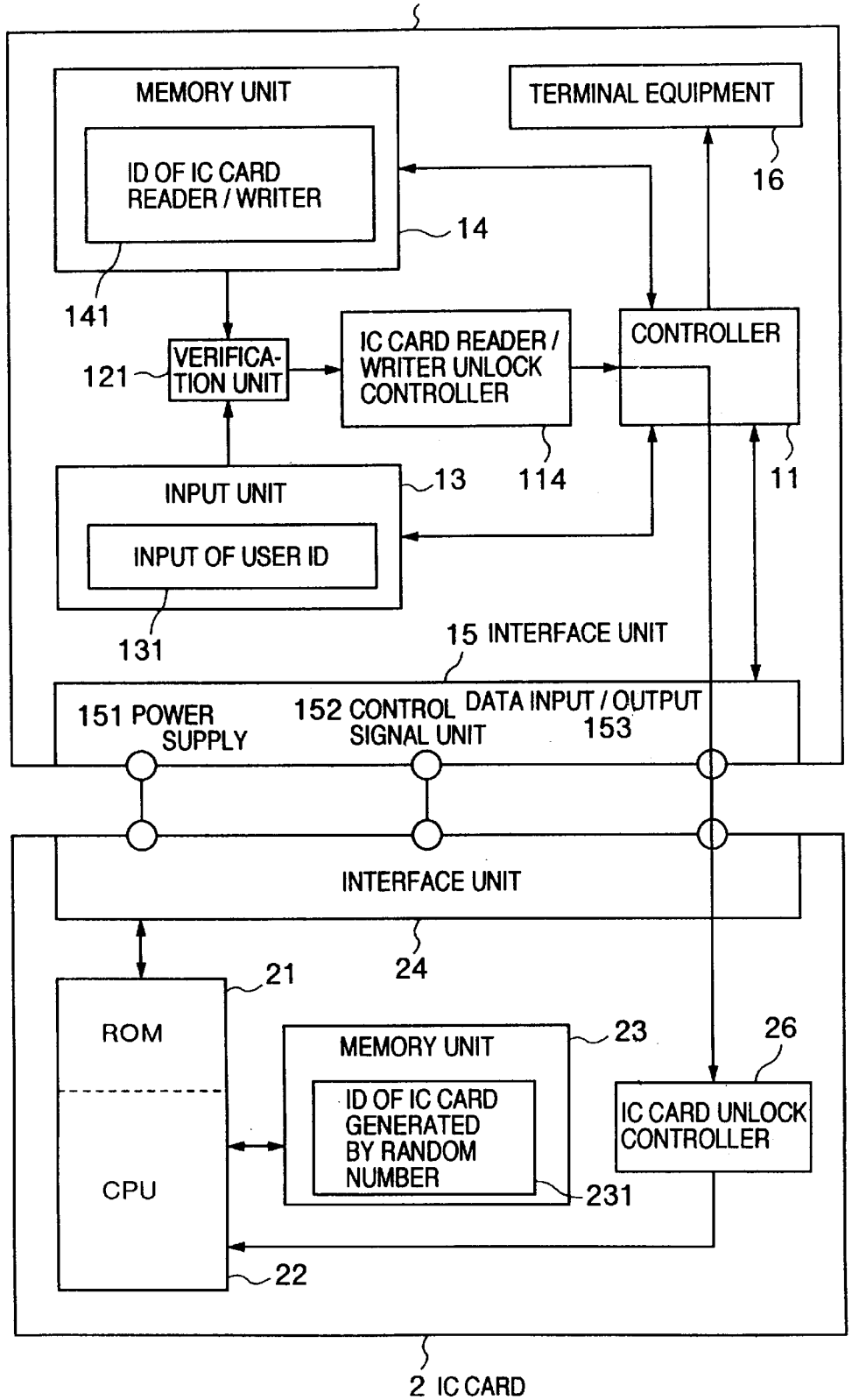
FIG. 15 shows in block form an embodiment of an electronic wallet system corresponding to the embodiment shown in FIG. 14, according to the invention.

FIG. 15 illustrates an unlock method corresponding to the lock method illustrated in FIG. 14. An IC card 2 is loaded into the IC card reader/writer 1 and a user ID 131 is entered from the input unit 13. A verification unit 121 verifies the entered user ID 131 and an ID 141 of the IC card reader/writer 1 stored in the memory unit 14. If verifiable, an unlock controller 114 of the IC card reader/writer 1 outputs an unlock control signal to the controller 11 to unlock the IC card reader/writer 1. An unlock control signal for the IC card 1 is also supplied via the controller 11 and data input/output unit 153 to the IC card 2. The IC card unlock controller 26 automatically unlocks the IC card 2.

In this manner, the IC card cannot be unlocked if the IC card reader/writer is not assigned and allocated to the user. Even if the IC card is stolen and it is used at a different IC card reader/writer 1, data cannot be obtained from this different IC card reader/writer because ID of the IC card is generated by a random number.

Figure 16:
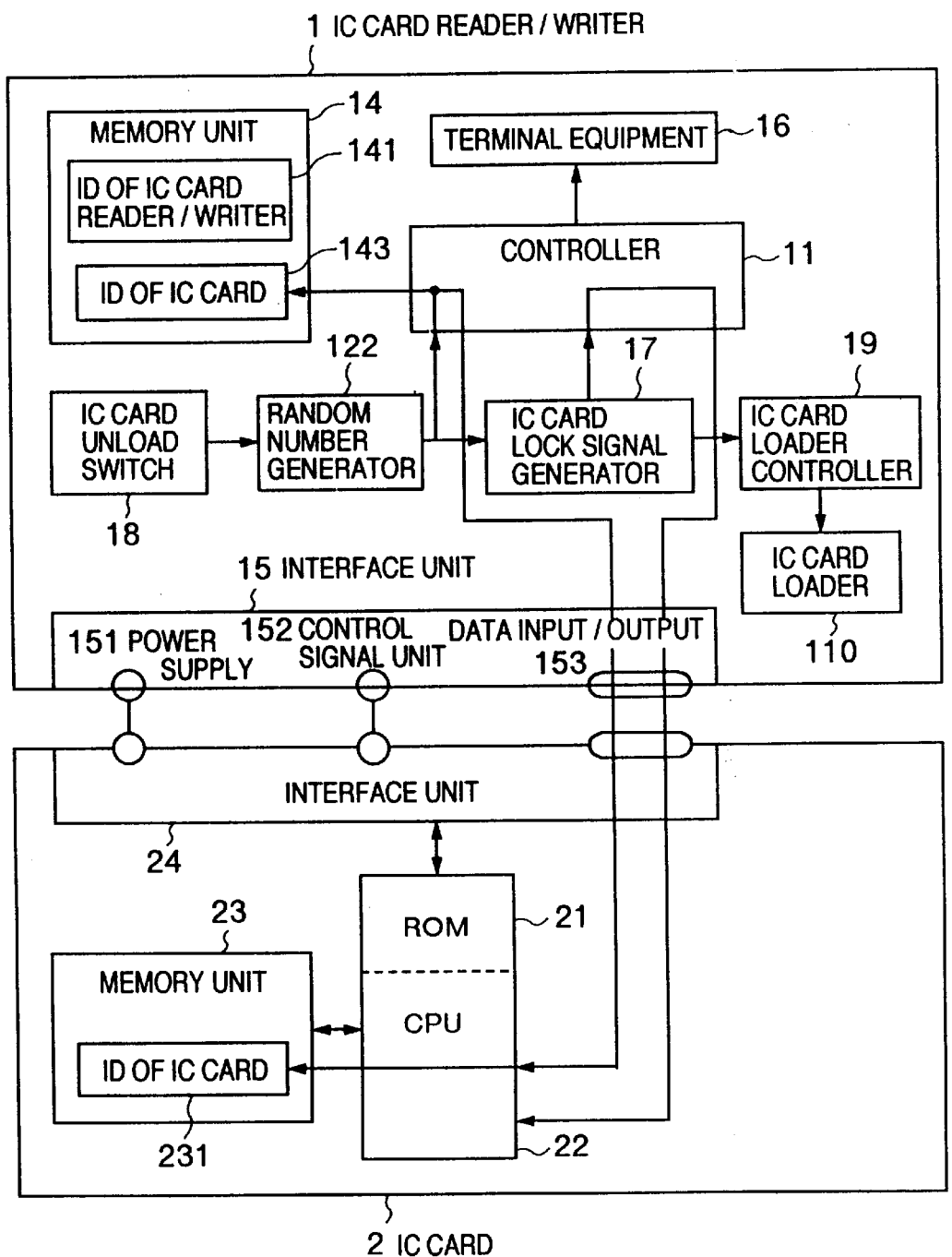
FIG. 16 shows in block form an embodiment of an electronic wallet system, according to the invention.

FIG. 16 shows another embodiment of the invention in block form. In this embodiment, when an IC card 2 is tried to unload from an IC card reader/writer 1, a random number generator 122 of the IC card reader/writer 1 generates a random number which is supplied to the IC card 2 to use it as an ID of the IC card 2. At this time, an IC card lock signal generator 17 generates a lock control signal to automatically lock the IC card. An unlock method is illustrated in FIG. 16. The IC card reader/writer 1 is unlocked by the user ID, and an ID of the IC card generated previously is sent to the IC card. The IC card 2 then outputs an unlock control signal to automatically unlock the IC card 2. The user can use only the IC card reader/writer 1 assigned to the user.

First, the lock method for an IC card illustrated in FIG. 16 will be described. When the IC card 2 is tried to unload from the IC card reader/writer 1 by operating upon the IC card unload switch 18, the random number generator 122 generates a random number. This random number is stored in the memory unit 14 as an ID of the IC card 2 (IC card and ID 143). At the same time, the random number is stored as an ID of the IC card 2 in the memory unit 23 of the IC card 1 (IC card ID 231), via the data input/output unit 153. Thereafter, the IC card lock signal generator 17 generates a lock control signal and supplies it via the controller 11 and data input/output unit 153 to CPU 22 to automatically lock the IC card 2.

Figure 17:
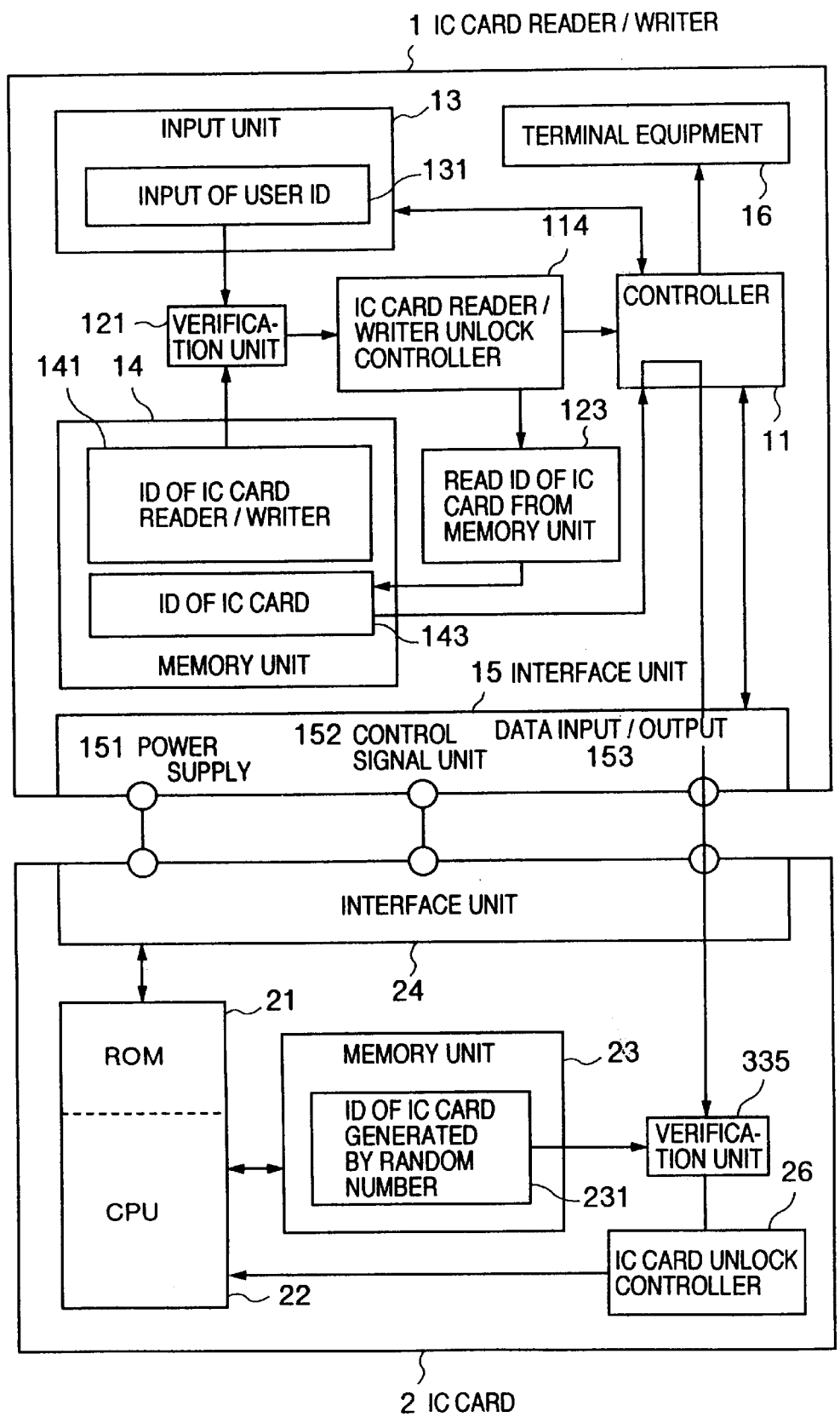
FIG. 17 shows in block form an embodiment of an electronic wallet system corresponding to the embodiment shown in FIG. 16, according to the invention.

FIG. 17 illustrates an unlock method corresponding to the lock method illustrated in FIG. 16. An IC card 2 is loaded into an IC card reader/writer 1 and a user ID 131 is entered from the input unit 13. A verification unit 121 verifies an ID of the IC card reader/writer 1 stored in the memory unit 14. If verifiable, an IC card reader/writer unlock unit 114 outputs an unlock control signal to the controller 11 to unlock the IC card reader/writer 1. At the same time, an ID 143 of the IC card 2 is read from the memory unit 14 and supplied via the controller 11 and data input/output unit 153 to the IC card 2. A verification unit 335 compares an ID 231 of the IC card 2 stored in the memory unit 23 with the ID 143 of the IC card sent from the IC card reader/writer 1. If both the IDs coincide with each other, the IC card unlock controller 26 outputs an unlock control signal to CPU 22 to automatically unlock the IC card 2. Read ID 123 of IC card from memory unit 123 serves to read out from memory unit 14 ID of IC card 143 stored therein. The read IC card ID 143 is passed to the IC card through the controller 11.

Figure 18:
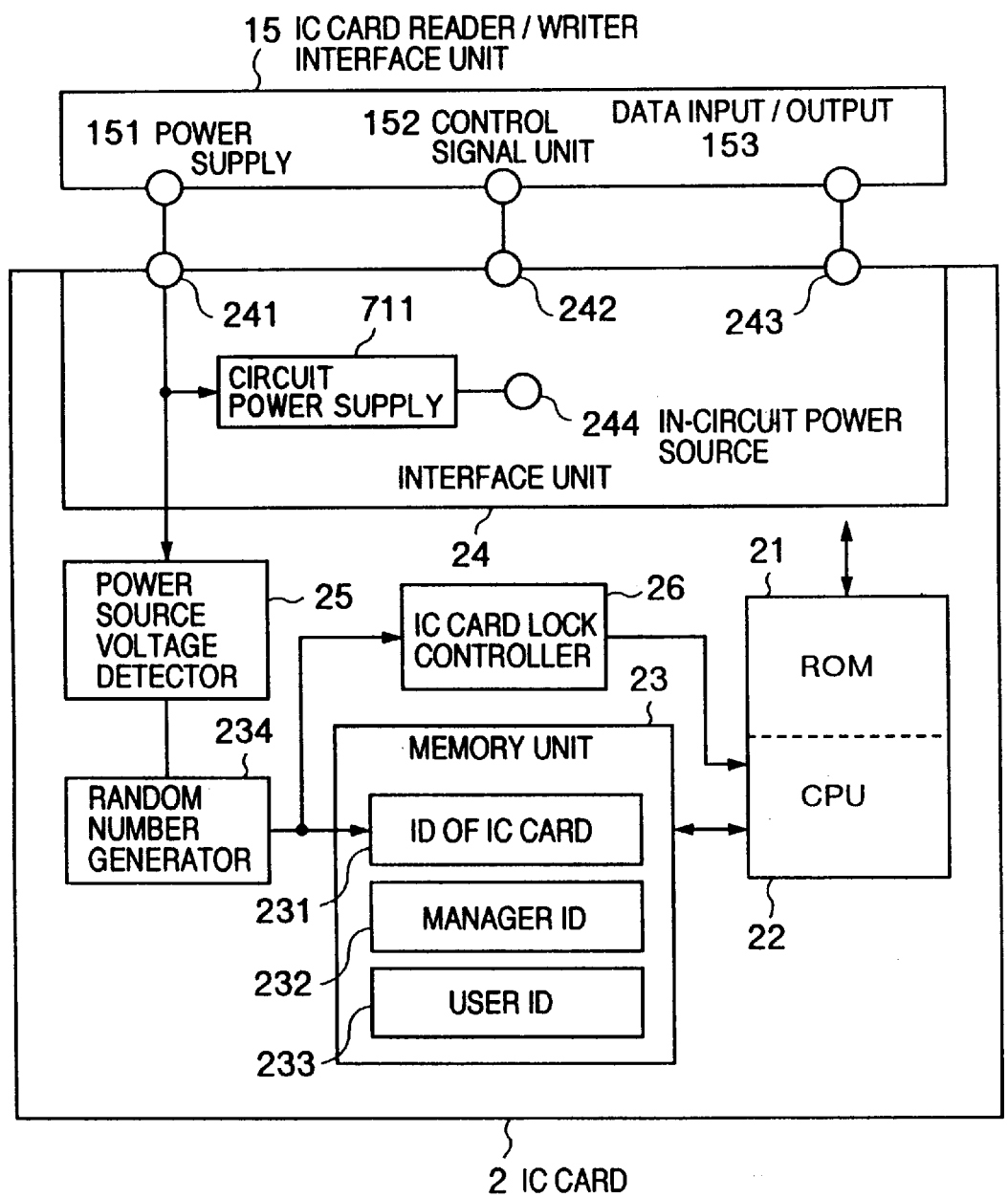
FIG. 18 shows in block form an embodiment of an electronic wallet system, according to the invention.
Figure 19:
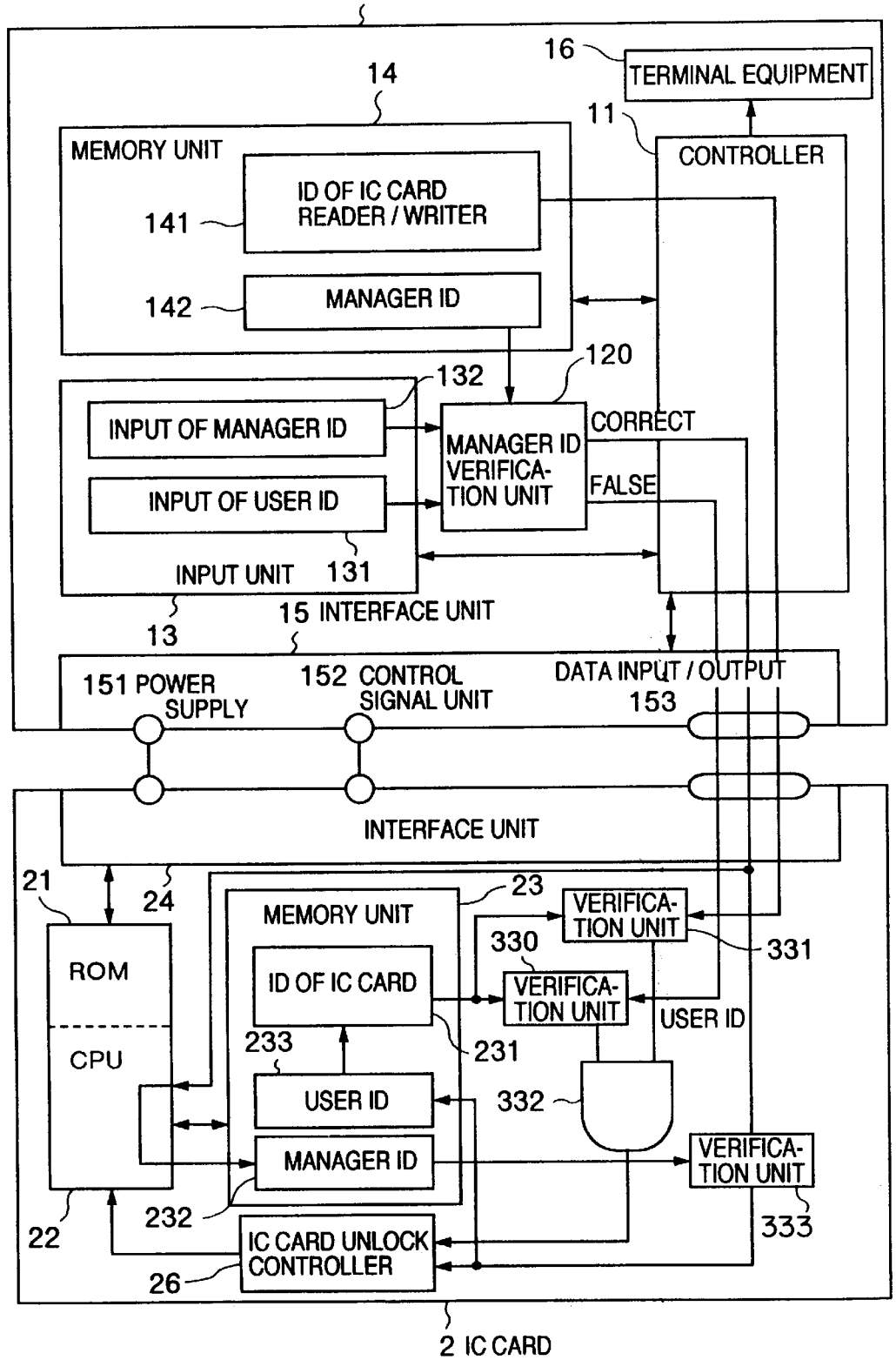
FIG. 19 shows in block form an embodiment of an electronic wallet system corresponding to the embodiment shown in FIG. 18, according to the invention.

A method, by which vandalism by a user (register clerk) of an IC card reader/writer can be prevented and the IC card reader/writer is made easy to use, is illustrated in FIGS. 18 and 19. An IC card has a plurality of keys (pass words), a first lock of the IC card is released by a password of a high priority order manager and a random number ID is discarded to allow a register clerk to use its own ID. A second lock is released by the ID of the register clerk to permit a use of the IC card. In this manner, security can be improved and the IC card reader/writer is made easy to use. Thus, an electronic wallet system includes means for updating an ID number of the IC card, wherein the higher priority order ID number verifying means activates said ID number updating means.

FIG. 18 illustrates an IC card lock method. When an IC card is unloaded from an IC card reader/writer, a random number is entered as an ID of the IC card to lock it (similar to FIG. 14). In addition to the random number ID, the IC card has a manager ID (highest priority order) and a user ID. These IDs have a higher priority order of a manager ID 232, a random number ID 231, and a user ID 233 in this order recited. Communication is made to the card via the communication paths 241, 242, 243.

FIG. 19 illustrates an IC card unlock method corresponding to the method illustrated in FIG. 18. A manager ID 131 is entered from the input unit 13 of an IC card reader/writer 1. If the manager ID 142 is verifible, a random number ID 231 of the IC card 2 is replaced by a user (register clerk) ID 233 stored in the memory unit. The user (register clerk) can unlock the IC card by using its own ID. With this arrangement, security can be improved, and the IC card reader/writer can be made easy to use.

A vandalism preventing system capable of inhibiting a refundment of money larger than a credit money value paid for one transaction.

As described above, according to the above embodiments, an electronic wallet system easy to use having high security can be realized.

Since an IC card can be automatically locked when it is unloaded from an IC card reader/writer, it is possible to realize an electronic wallet with high security.

When an IC card is loaded into an IC card reader/writer, the IC card or IC card reader/writer generates an IC card unlock control signal to automatically unlock the IC card. It is therefore possible to realize an electronic wallet system easy to use.

In the embodiments used by an IC card POS system, a register clerk can use only the register assigned to the clerk.

Therefore, vandalism of stealing cash information from an IC card can be presented. In an IC card having a plurality of IDs, a manager can use a plurality of registers and the electronic wallet system is made easy to use.

If an ID of an IC card is generated by a random number when the IC card is unloaded from a register, security can be improved. In this case, the IC card cannot be unlocked unless another register has the random number ID of the IC card. On the other hand, a manager can unlock the IC card with a random number ID by using an ID of the manager, so that the register can be made easy to use.

In an electronic wallet system using an IC card, money larger than credit money paid for one transaction from the IC card to the register (IC card reader/writer) is inhibited from being refunded. A refundment is also inhibited unless cash information is supplied from the IC card to the register. One transaction starts from loading the IC card into the register and ends at unloading the IC card from the register. With this arrangement, even if one register is used by a plurality of register clerks, vandalism of entering cash information of other users into their own IC cards can be prevented. At the midst of depositing money on a register (IC card reader/writer), money can be refunded to the IC card.

Figure 20:
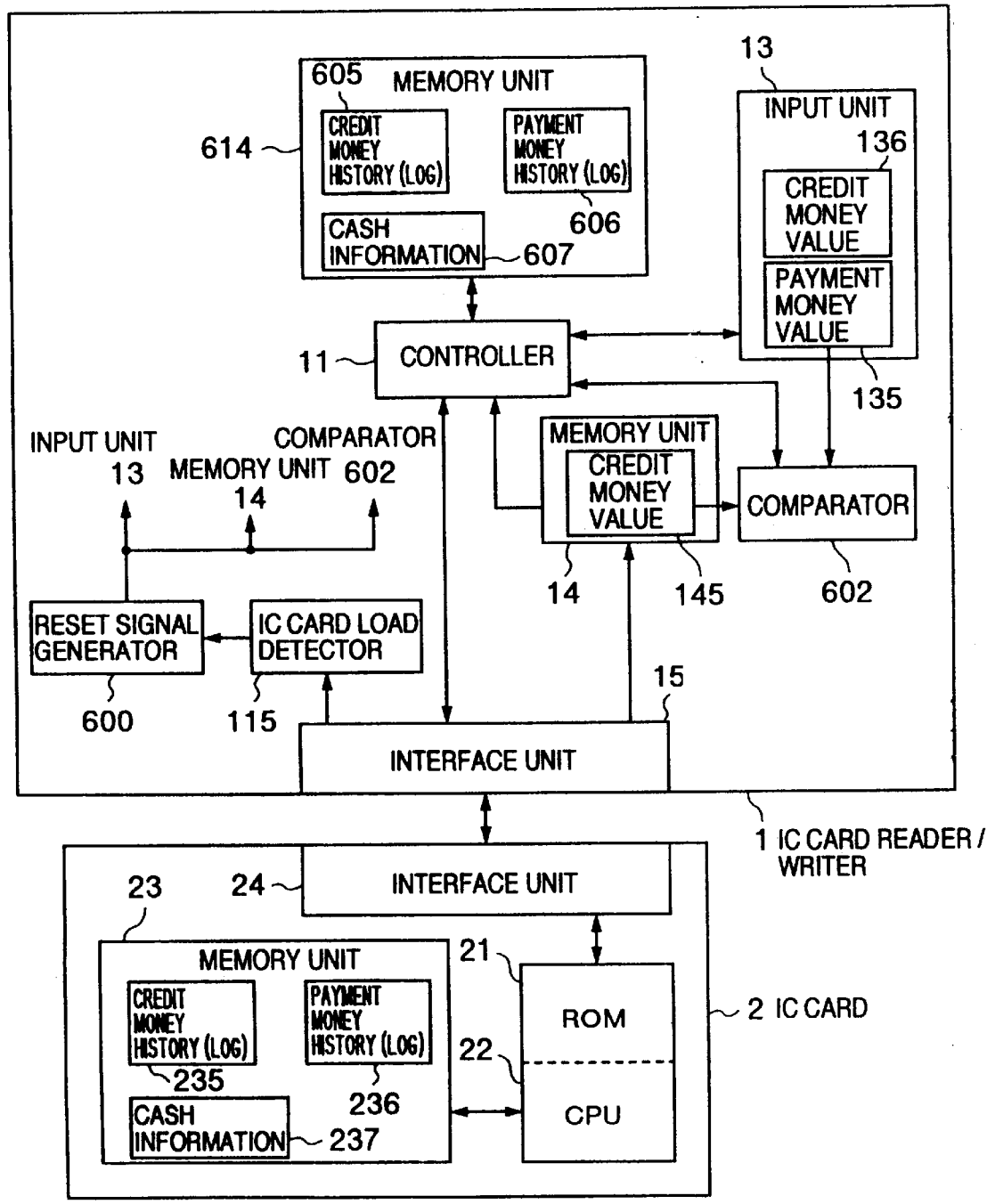
FIG. 20 shows in block form an embodiment of an electronic wallet system in which a refundment of money larger than a credit money value input to an IC card reader/writer is not permitted.

FIGS. 20 shows an embodiment of the invention in block form. Reference numeral 1 represents an IC card reader/writer, reference numeral 13 represents an input unit such as a keyboard and a bar code reader, reference numeral 11 represents a controller, and reference numeral 14 represents a first memory unit of the IC card reader/writer for temporarily storing a credit money value. Input unit 13 inputs a credit value 136 and a payment value 135. Reference numeral 15 represents an interface unit for data transfer to and from an IC card, reference numeral 115 represents an IC card load detector, reference numeral 600 represents a reset signal generator, reference numeral 602 represents a comparator for comparing a payment money value with a credit money value, reference numeral 614 represents a second memory unit of the IC card reader/writer for storing a credit money history (log) 605, a payment money history (log) 606, and cash information 607. The controller 11 controls the input unit 13, memory units 14 and 614, interface unit 15, and comparator 602.

Reference numeral 2 represents an IC card, reference numeral 21 represents a ROM, reference numeral 22 represents a CPU, and reference numeral 23 represents a memory unit for storing a credit money history (log) 235, a payment money history (log) 236, and cash information 237. Reference numeral 24 represents an interface unit for data transfer to and from the IC card reader/writer.

A flow of cash information when cash is refunded from the IC card reader/writer 1 to the IC card 2, will be described.

First, the IC card 2 is loaded into the IC card reader/writer 1. The load detector 115 detects a load, and the reset signal generator 600 generates a reset signal. This reset signal is generated each time an IC card is loaded and initializes the comparator 602 and memory unit 14.

As described above, in accordance with the present embodiment, a refund cannot be permitted if payment by electronic money has been performed using an IC card. Description will be here made of payment of electronic money.

Money amount information for the price is entered from the input unit 13 of the reader/writer 1, and then electronic money information is stored in the memory unit 14 of the reader/writer 1 from the IC card 2 by operation of controller 11. When a request for refunding all or part of the price is issued by a customer, electronic money information corresponding to the requested refund amount is entered from the input unit 13. When a payment money value is entered from the input unit 13, the comparator 602 compares whether the payment money value 135 is equal to or smaller than the credit money value 145. If equal to or smaller than the credit money value 145, the controller 11 sends the credit money value 145 to the memory unit 614, and cash information is supplied from the memory unit 614 to the memory unit 23 of the IC card 1. In this manner, cash information and payment and credit money histories of the memory units 614 and 23 are updated so that the new cash information can be reliably supplied from the IC card reader/writer 1 to the IC card 1. Vandals of stealing cash information can be prevented.

Figure 21:
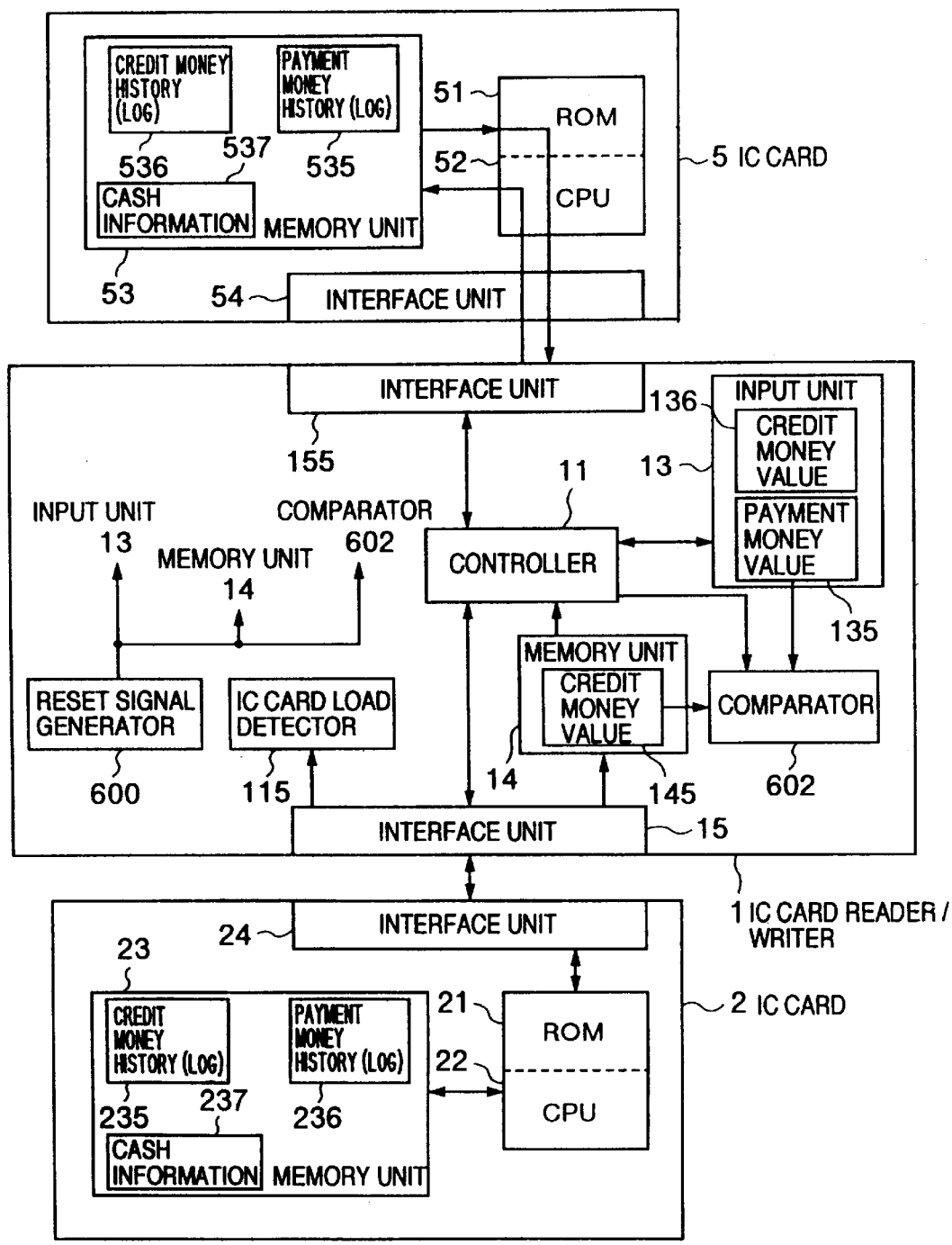
FIG. 21 shows in block form an embodiment of an electronic wallet system in which a refundment of money larger than a credit money value input to an IC card is not permitted.

FIG. 21 shows another embodiment of the invention in block form in which the memory unit 14 storing cash information of the IC card reader/writer 1 shown in FIG. 20 is provided on the side of another IC card 5. The operation of this embodiment is similar to FIG. 20. Cash information can be read from the IC card 5 by the IC card reader/writer 1. The IC card 5 is one at the side of retail shop. A memory unit 53 stores a credit money history 536, a payment money history 535 and cash information 537 at the side of retail shop which are read out from the IC card reader/writer 1 are stored in a memory unit 53. These items of the information are controlled by a CPU 52 and a ROM 51, which transfer information with the reader/writer 1 via interface units 54 and 155. With this arrangement, a cost effective off-line system can be realized between retail shows and banks.

In a POS system using an IC card, money larger than a credit money value paid for one transaction from the IC card to the register is inhibited from being refunded. A payment is also inhibited unless cash information is supplied from the register to the IC card. One transaction starts from loading the IC card into the register and ends at unloading the IC card from the register. With this arrangement, even if one register is used by a plurality of register clerks, vandalism of entering cash information of other users into their own IC cards can be prevented.

After verifying the credit histories in a register and an IC card, the old transactions can be erased to make the register easy to use.

With a POS system having high security, a register clerk is not needed and a manless POS system is possible.

Next, with reference to FIG. 22, another embodiment of an electronic wallet system of this invention will be described, in which if an IC card for storing transactions of a retail shop is robbed illegally from a register, an illegal code is automatically input to the IC card and it cannot be used again. When this illegal code is generated, cash information of a retail shop is saved in the memory unit of the register.

Figure 22:
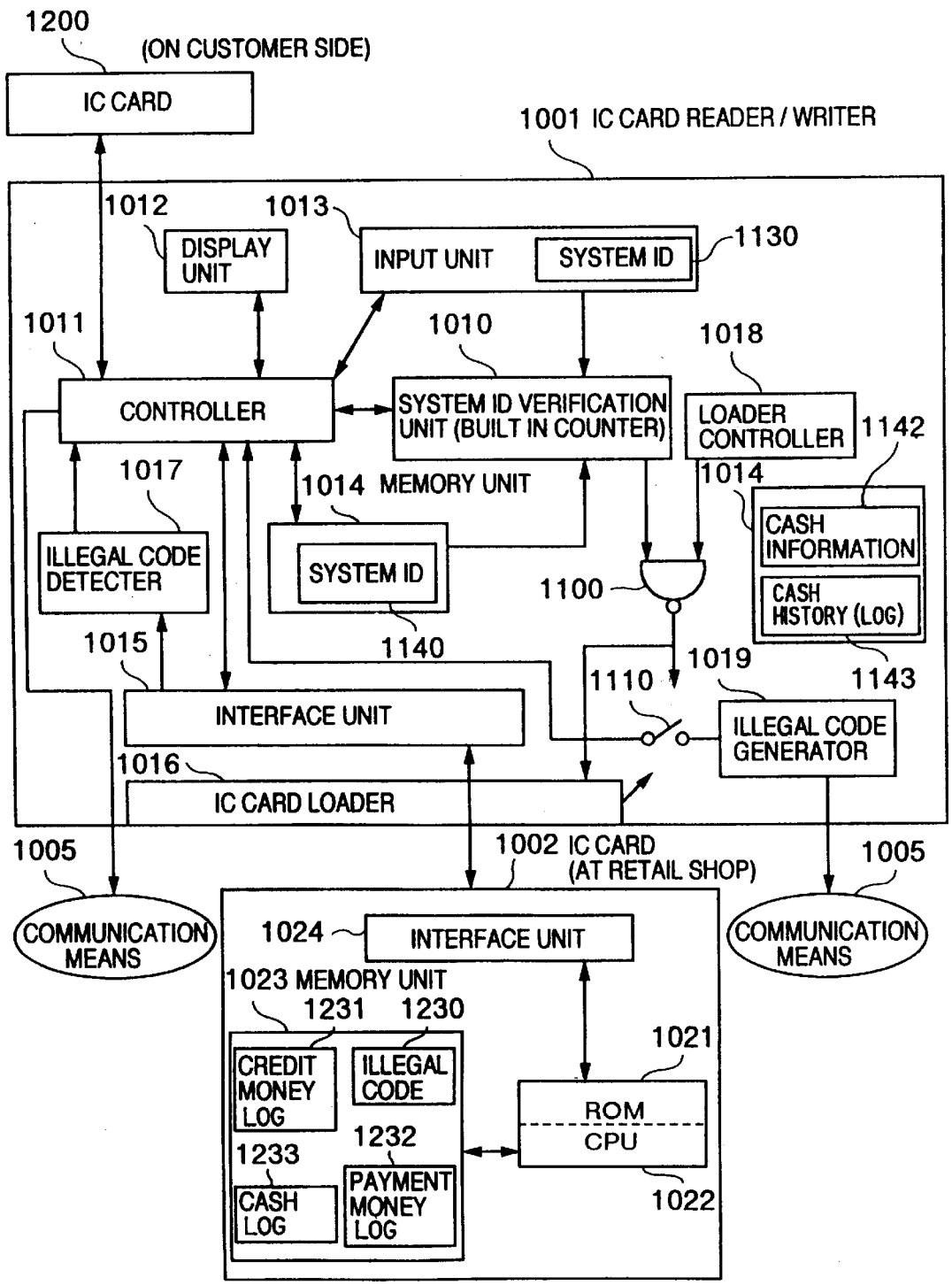
FIG. 22 shows in block form an embodiment of an electronic wallet system according to the invention.

In FIG. 22 showing the embodiment of the electronic wallet system, reference numeral 1001 represents an IC card reader/writer, 1002 represents an IC card on a retail shop side, 1200 represents an IC card on a customer side, 1005 represents a communication means, 1010 represents a system ID verification unit, 1011 represents a controller, 1012 represents a display unit, 1013 represents an input unit, 1015 represents an interface unit, 1016 represents an IC card loader, 1017 represents an illegal code detector, 1018 represents a loader controller, 1019 represents an illegal code generator, 1100 represents a NAND gate, 1110 represents a switch, 1021 represents a ROM, 1022 represents a CPU, 1023 represents a memory unit, and 1024 represents an interface unit.

Next, the operation of the electronic wallet system constructed as above will be described. The controller 1011 controls the blocks (1012, 1013, 1014, and 1015) of the IC card reader/writer 1001. The IC card 1002 on the retail shop side is mounted on a loader 1016 of the IC card reader/writer 1001 such as an IC card tray or slot. In unloading the IC card 1002 on the retail shop side, after an unrepresented IC card unload switch at the loader controller 1018 is pushed, a system ID 1130 specific to the system is entered from the input unit. A system ID 1140 registered in the memory 14 of the IC card reader/writer is verified by a system ID verification unit 1010 as to whether it matches with a system ID 1130 entered from an input unit 1013. Thereafter, the IC card 1002 can be unloaded from the IC card loader 1016.

If the IC card 1002 is unloaded without performing the above operations, the illegal code generator 1019 generates an illegal code which is stored in the memory unit 1023 of the IC card 1002. Illegal actions include breaking the loader 1016 and robbing the IC card 1002 therefrom, or inputting unverifiable IDs different from the system ID 1130 several times. If the IC card loader 1016 is broken or if a foreign substance different from an IC card becomes in contact with the IC card loader 1016, the switch 1110 is turned on. If the system ID 1130 cannot be verified, the switch 1110 turns on. With such illegal actions, the switch 1110 turns on so that the illegal code generator 1019 generates an illegal code to automatically notify an illegal action via the communication means 1005 such as telephone lines to the external facilities such as a guard man and a police station. More particularly, an electronic wallet system using an IC card 1200 for storing electronic money information, includes: credit means for supplying cash information from a first IC card to a second IC card; payment means for supplying cash information from the second IC card to the first IC card; a controller unit for maintaining the normal state of the payment means refunding a payment money value from the second IC card to the first IC card; urgent means for inhibiting a normal operation of the controller during an urgent period; an illegal code generator unit responsive to the urgent means for generating an illegal code; a memory unit for storing the illegal code in the first IC card; and communication means responsive to a generation of the illegal code from the illegal code generator unit, for automatically notifying a predetermined site of the generation of the illegal code. An illegal action may be notified by directly controlling the illegal code generator 1019 without using the switch 1110.

When an illegal code is generated, the cash information 1142 and cash information history 1143 are left in the memory unit 1014 of the IC card reader/writer 1001. The illegal code is supplied via the interface units 1015 and 1024 to the memory unit 1023 of the IC card 1002 and stored therein as the illegal code 1230. When the illegal code is generated, a data transfer speed between the IC card and IC card reader/writer is changed to be faster than a normal speed. Accordingly, an electronic wallet system includes means for changing a data transfer speed between the IC card and the IC card reader/writer faster than a normal speed, when the illegal code generator generates the illegal code.

If an IC card 1002 with an illegal code stored therein is loaded into the IC card loader 1016, the illegal code 1230 is supplied via the interface unit 1015 of the IC card reader/writer 1001 to the illegal code detector 1017. When the illegal code 1230 is detected, the controller 1011 controls the interface unit 1015 so that cash information cannot be transferred to and from the IC card. In addition, when the illegal code 1230 is detected, this fact is automatically notified via the communication means 1005 such as telephone lines to the external facilities such as a guard man and a police station. Even if the IC card has the illegal code, a dummy operation of cash information transfer may be performed in order for the vandal not to scent out the detection of the illegal code.

In the above manner, a stolen and illegal IC card with cash information of the register cannot be used. The cash information 1233 can be left in the memory unit 1023 of the register. In addition, the memory unit 1023 stores the credit money history 1231 and payment money history 1232.

Next, with reference to FIG. 23, another embodiment will be described in which if cash information of the results of transactions of a retail shop is illegally transferred from the IC card of the retail shop to another IC card, an illegal code, false cash information, and illegal code generation history are lest in the IC card. In this case, cash information is not transferred from the IC card of the retail shop storing the transaction results into the other IC card.

In the system of this embodiment, transaction information of a retail shop cannot easily transfer to another IC card. For example, when cash information is transferred (refunded) from the register to an IC card, the system does not permit to transfer money larger than a credit money value paid to a retail shop for one transaction, to the IC card of a customer.

If cash information is tried to be transferred to an IC card not by a normal refundment but by an illegal action, an illegal code is automatically written in the IC card.

This illegal action other than a normal refundment is, for example, a transfer of cash information to an AC card by a user threatened by a burglar or the like.

Figure 23:
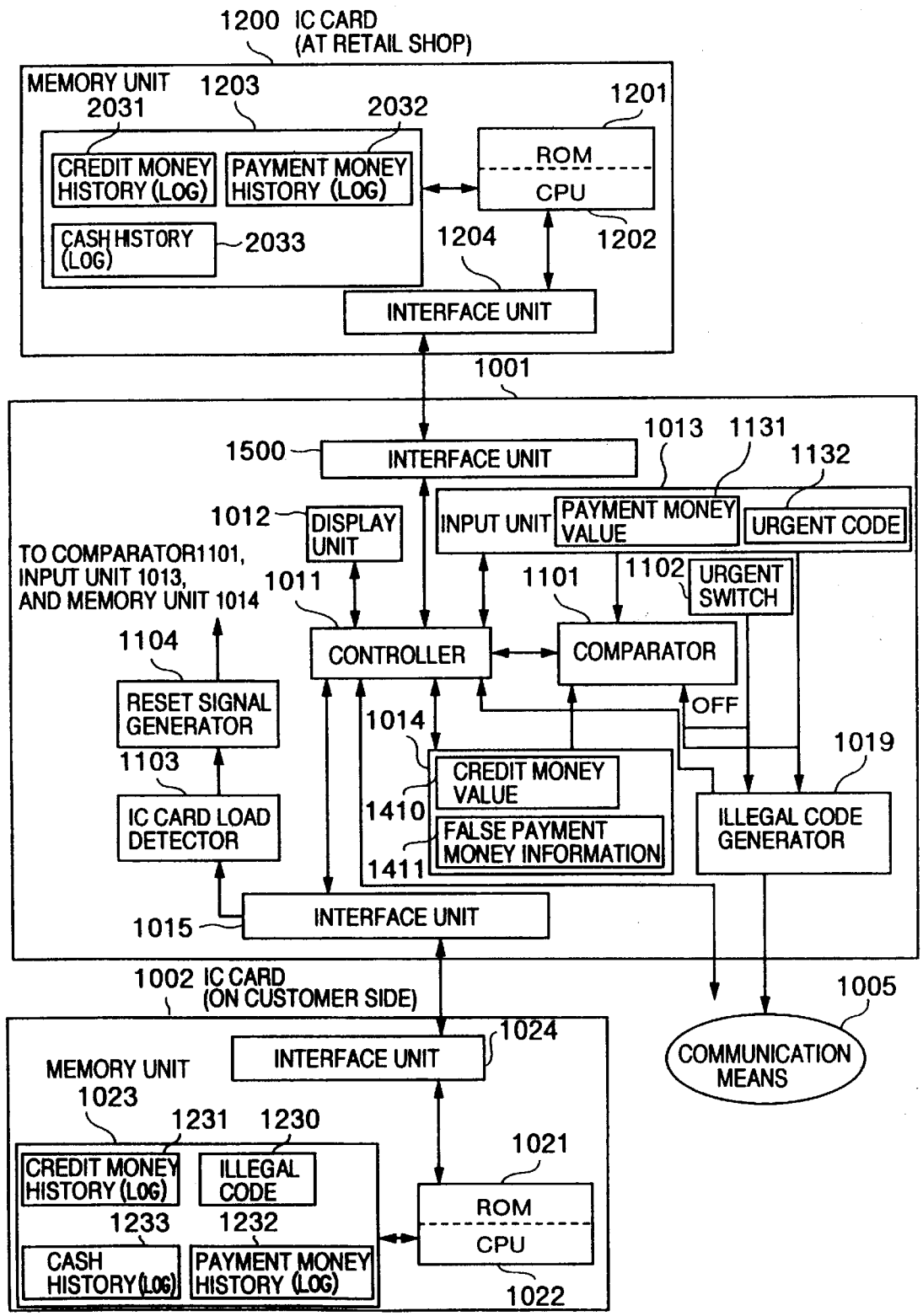
FIG. 23 shows in block form another embodiment of an electronic wallet system according to the invention.

Referring to FIG. 23 showing the embodiment of the invention, when cash information 2033 of an IC card 1200 of a retail shop is illegally transferred to another IC card 1002, the IC card reader/writer 1001 automatically writes an illegal code into the IC card 1002. When this card 1002 is used thereafter, the illegal code is detected and the money cannot be paid to this IC card 1002.

The operation of the system shown in FIG. 23 will be described.

Reference numeral 1001 represents an IC card reader/writer, 1002 represents an IC card on the customer side, and 1200 represents an IC card on the retail shop side which stores cash information. Reference numeral 1013 represents an input unit such as a keyboard and a bar code reader, 1011 represents a controller, and 1014 represents a memory unit of the IC card reader/writer for temporarily storing a credit money value. Reference numeral 1015 represents an interface unit for data transfer to and from an IC card, 1103 represents an IC card load detector, 1104 represents a reset signal generator, and 1101 represents a comparator for comparing a payment money value with a credit money value to ascertain that the payment money is smaller than the credit money value.

The IC card 1002 on the customer side includes an interface unit 1024, a ROM 1021, a CPU 1022, and a memory unit 1023. The memory unit 1023 stores credit money history 1231, payment money history 1232, and cash information 1233. The interface unit 1024 transfer data to and from the IC card reader/writer. The IC card 1200 on the retail shop side has the same structure as the IC card 1002 on the customer side.

A flow of cash information when cash information is sent from the IC card 1200 to the IC card 1002, will be described.

First, the IC card 1002 is loaded into the IC card reader/writer 1001. The IC card 1200 on the retail shop side is being loaded into the IC card reader/writer 1001. The loading of the IC card 1002 is detected by the load detector 1103, and a reset signal is generated by the reset signal generator 1104. This reset signal is generates each time an IC card is loaded, to initialize the comparator 1101 and memory unit 1104. Next, when a credit money value 1014 is entered from the input unit 1013, the credit money value is temporarily stored in the memory unit 1014 via the memory unit 1023 of the IC card 1002 and the interface units 1024 and 1015. Although the credit money value is once entered, if the user decides not to buy a good, the credit money value is refunded. For the money refundment, the IC card reader/writer 1 refunds the credit money value from the IC card 1200 to the IC card 1002. When the payment money is entered from the input unit 1013, the comparator 1101 compares as to whether the payment money value 1131 is equal to or smaller than the credit money value. If equal to or smaller than the credit money value, the controller 1011 transfers the credit money value to the memory unit 1203 of the IC card 1200 which in turn sends cash information to the memory unit 1023 of the IC card 1002. In this manner, cash information 2033, credit money history 2031, and payment money history 2032 in the memory units 1203 and 1023 are updated so that cash information can be sent from the IC card 1200 to the IC card 1002 and an illegal transfer of cash information can be prevented.

A countermeasure for an illegal action other than a normal refundment, for example, for a user threatened by a burglar to transfer cash information to an IC card, will be described.

When an urgent code 1132 is entered from the input unit 1013 or when an urgent switch 1102 which is an emergency switch to be used upon being mugged for example is pushed, the illegal code generator 1019 generates an illegal code. This illegal code is written in the memory unit 1023 of the IC card 1002 via the interfaces 1015 and 1024 and the controller 1011. Also when the illegal code is generated, false payment money information 1411 is written in the IC card 1002 via the interfaces 1015 and 1024. The cash information 2033 of the IC card 1200 does not change. A history of illegal code generation is left in the memory units 1014 (containing credit money value 1140 and false payment money information 1411), 1203, and 1023.

In the above manner, even if cash information at the register is tried to transfer to another IC card by an illegal action, the illegal code is written in the IC card and this card cannot be used. Furthermore, the cash information of the IC card storing transaction results at the register can be left.

Figure 24:
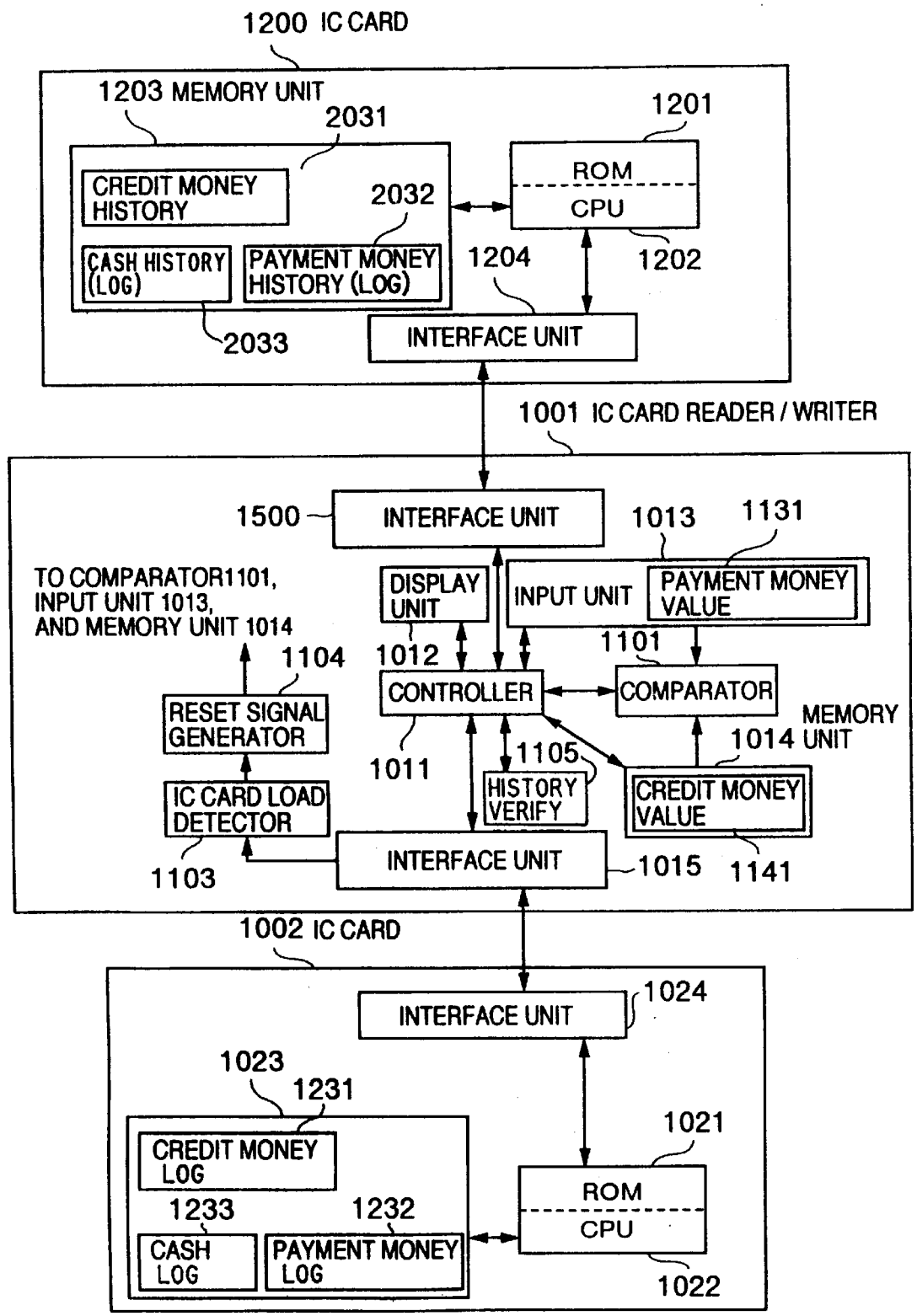
FIG. 24 shows in block form an embodiment of an electronic wallet system in which a refundment of money larger than a credit money value input to an IC card is not permitted.
Figure 25:
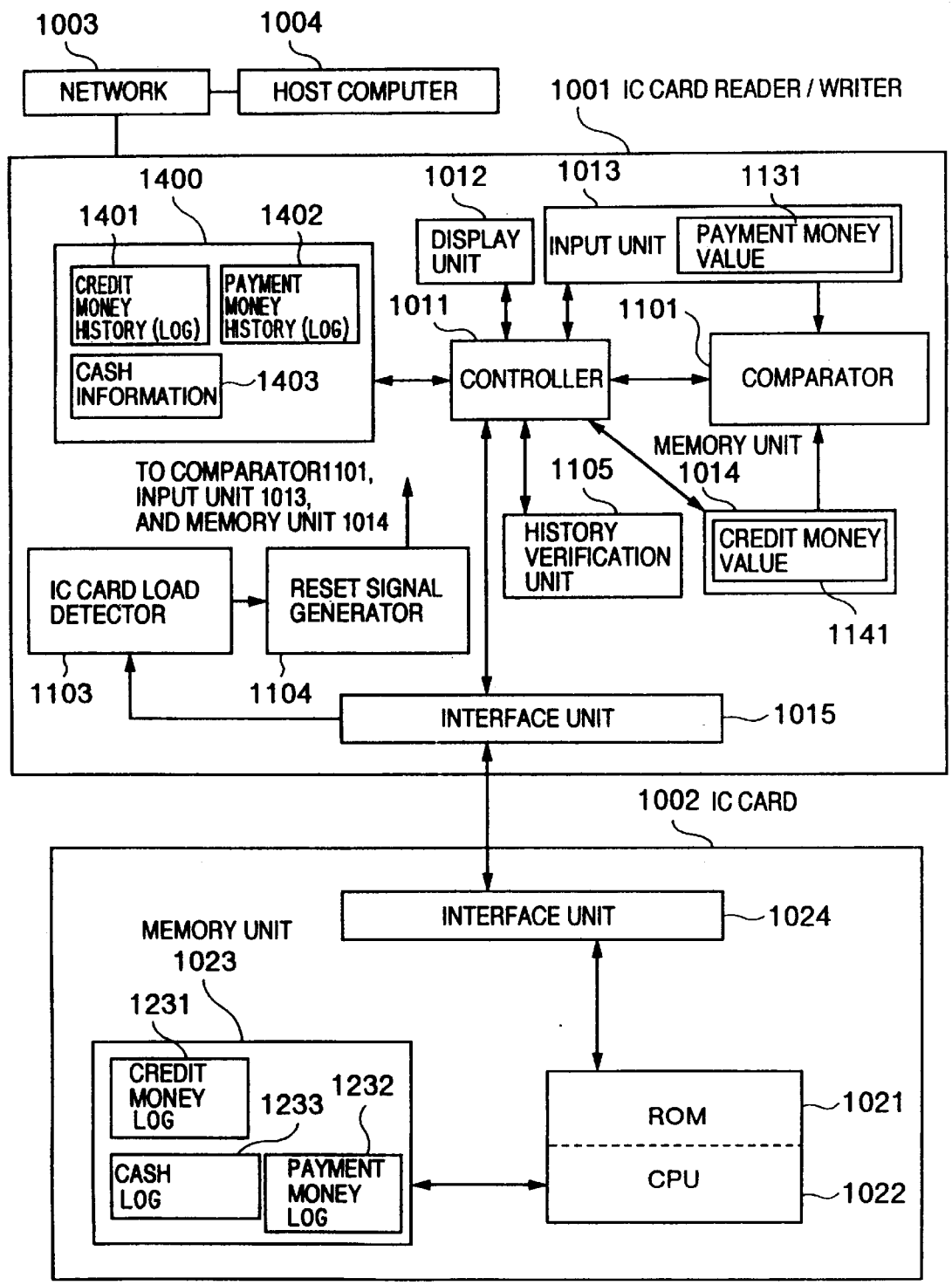
FIG. 25 shows in block form an embodiment of an electronic wallet system according to the invention.

Referring to FIGS. 24 and 25, another embodiment will be described in which the electronic wallet system is made easy to use in inhibiting to transfer money larger than a credit money value paid for one transaction. Histories stored at a register and histories stored at a user's IC card are verified, and if verifiable, a quasi state same as when a credit money value is supplied to the register is produced to allow a refundment to the IC card.

In FIG. 24 showing an electronic wallet system in block form, similar to FIG. 23, credit money value is sent from the IC card 1002 to the IC card 1200 and the comparator 1101 compares as to whether the payment money value 1131 is equal to or smaller than the credit money value 1141. If equal to or smaller than the credit money value 1141, the controller 1011 transfers the credit money value 1141 to the memory unit 1203 which in turn sends cash information to the memory unit 1023 of the IC card 1002. In this manner, cash information, credit money history, and payment money history in the memory units 1203 and 1023 are updated so that cash information can be reliably sent from the IC card 1200 to the IC card 1002 and an illegal transfer of cash information can be prevented.

An IC card 1200 stores a primary transaction information of retail shop. In the IC card 1200 of the retail shop, a reference numeral 1203 denotes a memory unit. The memory unit 1203 stores a credit money history 2031, a payment money history 2032 and cash information 2033. Numeral 1201 denotes a ROM and a numeral 1202 denotes a CPU. Numeral 1204 denotes an interface unit, which conducts data transfer with the IC card reader/writer 1001 via an interface unit 1500 thereof.

In the method described in FIG. 23, the electronic wallet system is rather inconvenient in that cash information cannot be refunded since when another payment using IC card is done the information for refunding is cleared. To solve this, a history verification unit 1105 verifies the histories stored in the IC card 1200 and the histories stored in the IC card 1002. If verifiable, cash information can be refunded from the IC card 1200 to the IC card 1002 without incorporating the operation of the comparator 1101.

FIG. 25 shows another embodiment of an electronic wallet system of the invention, in block form. Reference numerals 1003 and 1004 represent a network and a host computer, respectively. The host computer controls the reader/writer 1001 via the network 1003. The IC card 1200 may be connected to the host computer.

In this embodiment shown in FIG. 25, a temporary storage place of a retail shop is not at the IC card on the retail shop side but at a memory unit 1400 of an IC card reader/writer 1001. A memory unit 1400 stores a credit money history 1401, a payment money history 1402 and cash information 1403. The operation of this system is similar to the system shown in FIG. 24. An off-line system between retail shops and banks can therefore be realized.

In the embodiments shown in FIGS. 22 to 25, it is possible to provide an electronic wallet system easy to use having high security and vandalism preventing facility.

In a POS system using an IC card, even if an IC card for storing cash information of a register is stolen by an illegal action, this stolen IC card cannot be used again and the cash information is left in the memory unit of the registration.

Even if cash information of a resister is illegally transferred to an IC card of a vandal, an illegal code is written in the IC card. Therefore, this IC card cannot be used again and the cash information of transaction results of the register is left.

In a POS system using an IC card, money larger than a credit money value paid for one transaction from the IC card to the register is inhibited from being refunded. A refundment is also inhibited unless cash information is supplied from the register to the IC card. One transaction starts from loading the IC card into the register and ends at unloading the IC card from the register. With this arrangement, even if one register is used by a plurality of register clerks, vandalism of entering cash information of other users into their own IC cards can be prevented.

In order to make the electronic wallet system easier to use, credit and payment histories stored at a register and at a user's IC card are verified, and if verifiable, a quasi state same as when credit money value is supplied to the register is produced to allow a refundment to the IC card.

With a POS system having high security, a register clerk is not needed and a manless POS system is possible.

What is claimed is:

1. An electronic wallet system having an IC card for storing electronic money and an IC card reader/writer unit installed in a point of sales management system (POS), in combination, said IC card having an electronic wallet function, said electronic wallet system comprising:

an IC card loader loading said IC card into said IC card reader/writer unit and unloading said IC card from said IC card reader/writer unit;

an IC card controller controlling the load/unload operation of said IC card; and a lock signal generator generating an IC card lock signal in response to a physical unload operation of said IC card in said IC reader/writer unit through said controller to lock the IC card when physically being unloaded.

2. An electronic wallet system according to claim 1, further comprising:

a power detector for detecting whether a voltage applied to the system has a predetermined value or not; and a data save signal generator generating a data save signal, wherein said power detector activates said data save signal generator and said lock signal generator in accordance with a detection result by said power detector.

3. An electronic wallet system according to claim 1, further comprising:

a load detector detecting a load of said IC card into said IC card loader of said IC card reader/writer; and an unlock signal generator generating an unlock signal in response to a load detection of said IC card by said load detector.

4. An electronic wallet system according to claim 1, further comprising:

a current detector detecting current supplied from said IC card reader/writer unit to said IC card; and an unlock signal generator generating an unlock signal in response to a current detection by said current detector.

5. An electronic wallet system according to claim 1, further comprising:

a control signal detector unit detecting an input of a control signal to said IC card;

a voltage detector unit detecting a voltage supplied to said IC card; and an unlock signal generator generating an unlock signal in response to detections by said control signal detector unit and said voltage detector unit.

6. An electronic wallet system according to claim 1, wherein said IC card includes a first storage unit storing a first ID number of said IC card, a random number generator generating a random number, and a second storage unit for storing a second ID number of said IC card, wherein said IC card load controller makes said first and second storage means store the random number as an ID number of said IC card and activates said lock signal generator.

7. An electronic wallet system according to claim 6, wherein said first and second storage units store a plurality of ID numbers with different priority orders.

8. An IC card electronic wallet system comprising:

an IC card for storing electronic money information, said IC card comprising: a power source voltage detector detecting an in-circuit power source voltage of said IC card;

a lock controller locking said IC card when the in-circuit power source voltage of said IC card becomes lower than a predetermined voltage; and an unlocking controller unlocking said IC card when the in-circuit power source voltage of said IC card becomes higher than a predetermined voltage and a control signal is inputted.

9. An IC card electronic wallet system wherein data is transferred between an IC card reader/writer and an IC card in a non-contact way, comprising:

said IC card storing electronic money information;

a receiver unit receiving data from sid IC card reader/writer;

a display unit notifying of data transfer;

a data transfer end checker checking an end of data transfer;

a voltage detector detecting an in-circuit power source voltage of said IC card;

a data saver activated when the in-circuit power source voltage of said IC card becomes lower than a predetermined voltage;

a controller responsive to outputs of said data transfer end checker and said voltage detector, for locking said IC card when the in-circuit power source voltage of said IC card become lower than the predetermined voltage and the data transfer end is confirmed;

a start checker checking a start of data transfer; and a controller unlocking said IC card when the in-circuit power source voltage of said IC card becomes higher than a predetermined voltage and the data transfer start is confirmed.

10. An IC card electronic wallet system with an ID number specific to the system, comprising:

an IC card storing electronic money information and having an ID number;

an IC card reader/writer for reading data from, and writing data into, the IC card;

an input unit for inputting data to the system;

a verifier verifying the ID number of the system and the ID number of said IC card;

an input verifier verifying an ID number entered from said input unit and the ID number of said IC card; and a controller unlocking said IC card if the plurality of ID numbers verified by said two verifiers are judged to be verifiable.

11. An electronic wallet system according to claim 10, further comprising:

an ID priority storer storing an ID number having a priority order higher than the ID number of the system;

an input/system priority verifier verifying whether the ID number entered from said input unit has a priority order higher than the ID number of the system;

a priority storer storing an ID number having a priority order higher than the ID number of said IC card;

an input/card priority verifier verifying whether the ID number entered from said input unit has a priority order higher than the ID number of said IC card; and a priority controller unlocking said IC card if the IDs verified by the two said verifiers are judged to be verifiable.

12. An electronic wallet system according to claim 11, further comprising an ID updater updating an ID number of said IC card, wherein said higher priority order ID number verifier activates said ID number updating means.

13. An IC card electronic wallet system with an ID number specific to the system, comprising:

an IC card storing electronic money informations;

an IC card reader/writer reading data from, and writing data into, said IC card;

an input unit inputting data to the system;

a verifier verifying an ID number entered from said input unit of the system and the ID number of the system; and a controller unlocking the system, wherein said controller unlocks the system if the ID numbers verified by said verifier are judged to be verifiable.

14. An IC card electronic wallet system comprising:

an IC card storing electronic money information, said IC card comprising:

a detector detecting an in-circuit power source voltage of said IC card;

a random number generator generating a random number;

a storer storing the random number generated by said random number generator as an ID number of said IC card; and a controller locking said IC card, wherein said detector activates said random number generator and said controller.

15. An IC card electronic wallet system with an ID number specific to the system, comprising:

an IC card for storing electronic money information;

an IC card reader/writer reading data from, and writing data into;

an input unit for inputting data to the system;

an input/system verifier verifying an ID number entered from said input unit of the system and the ID number of the system;

a controller unlocking the system if the ID number verified by said input/system verifier is judged to be verifiable; and a controller unlocking said IC card if the ID number verified by said input/system verifier is judged to be verifiable.

16. An electronic wallet system with an ID number specific to the system, comprising:

an IC card for storing electronic money informations;

an IC card reader/writer reading data from, and writing data into;

an input unit inputting data to the system;

an input/system verifier verification means for verifying an ID number entered from said input unit of the system and the ID number of the system;

a controller unlocking the system if the ID number verified by said input/system verifier is judged to be verifiable; and a reader reading an ID number of said IC card from said second storage unit if the ID number verified by said input/system verifier is judged to be verifiable; and wherein said IC card includes a first/second verifier verifying the ID number read from said second storage unit and an ID number of said IC card read from first storage unit, and if the IDs verified by said first/second verifier are judged to be verifiable, said IC card is unlocked.

17. An electronic wallet system comprising:

an IC card for storing electronic money information;

a credit unit supplying cash information from a first IC card to a second IC card;

a payment unit supplying cash information from said second IC card to said first IC card; and a comparator comparing a credit money value supplied from said first IC card to said second IC card with a payment money value supplied from said second IC card to said first IC card, wherein after said credit unit is operated, said payment unit is operated, and said payment unit is controlled in accordance with a comparison result by said comparator.

18. An electronic wallet system comprising:

an IC card for storing electronic money information;

an IC card reader/writer reading data from, and writing data into, said IC card;

a credit unit for supplying cash information from said IC card to the system;

a payment unit for supplying cash information from the system to said IC card; and a comparator comparing a credit money value supplied from said first IC card to the system with a payment money value supplied from the system to said first IC card, wherein after said credit unit is operated, said payment unit is operated, and said payment unit is controlled in accordance with a comparison result by said comparator.

19. An electronic wallet system according to claim 18, further comprising:

a storage unit storing the credit money value supplied from said IC card to the system;

an IC card load detector unit; and a control signal generator generating a control signal to initialize said credit unit, said payment unit, said comparator, and said storage unit, wherein said comparator activates said payment unit if the payment money value is smaller than the credit money value.

20. An IC card electronic wallet system with an ID number specific to the system, comprising:

an IC card for storing electronic money information;

an IC card reader/writer reading data from, and writing data into, said IC card;

IC card loader loading said IC card into, and unloading said IC card from, said IC card reader/writer;

IC card load controller controlling a load/unload operation of said IC card; and an input unit for inputting data to the system, wherein said IC card is unloaded in response to an activation of an unload operation by said IC card load controller and an input of the system ID from said input unit.

21. An electronic wallet system according to claim 20, further comprising a detector unit detecting said illegal code from said IC card, and a communication unit automatically notifying a designated site of a detection of said illegal code, when said illegal code is detected by said detector unit.

22. An electronic wallet system according to claim 20, wherein the system includes an illegal code generator generating an illegal code, said IC card includes a memory unit storing said illegal code and cash information, said IC card reader/writer includes a memory unit for storing cash information, wherein in response to an activation of an unload operation by said IC card load controller, an input of IDs different from the system ID from said input unit a predetermined plurality of times, or a lapse of a predetermined time period, said illegal code is generated and stored in said IC card, and said IC card is unloaded after the cash information in said IC card is stored in the memory unit of said IC card reader/writer.

23. An electronic wallet system according to claim 22, further comprising a communication unit for automatically notifying a designated site of issuance of an illegal code in response to said illegal code generated from said illegal code generator.

24. An electronic wallet system according to claim 22, further comprising a data transfer speed changer changing a data transfer speed between said IC card and said IC card reader/writer faster than a normal speed, when said illegal code generator generates said illegal code.

25. An electronic wallet system according to claim 22, wherein said illegal code is generated and stored in said IC card if said IC card is unloaded without using said IC card load controller.

26. An electronic wallet system comprising:
   an IC card for storing electronic money information;
   a credit unit supplying cash information from a first IC card to a second IC card;
   a payment unit supplying cash information from said second IC card to said first IC card;
   a controller unit maintaining the normal state of said payment unit refunding a payment money value from said second IC card to said first IC card;
   a urgent inhibition unit inhibiting a normal operation of said controller during an urgent period;
   an illegal code generator unit responsive to said urgent inhibition unit, for generating an illegal code;
   a memory unit storing said illegal code in said first IC card; and
   a communication unit responsive to a generation of said illegal code from said illegal code generator unit, for automatically notifying a predetermined site of the generation of said illegal code.

27. An electronic wallet system comprising: an IC card for storing electronic money information;
   a credit unit supplying cash information from a first IC card to a second IC card;
   payment unit supplying cash information from said second IC card to said first IC card; and
   a comparator comparing a credit money value supplied from said second IC card to said first IC card with a payment money value supplied from said second IC card to said first IC card,
   wherein after said credit unit operates, said payment unit is operated, said payment unit is controlled in accordance with a comparison result by said comparator, said first and second IC cards have credit/payment histories, and in response to verification of the credit/payment histories of said first and second IC cards, said payment unit is controlled.

28. An electronic wallet system comprising:
   an IC card for storing electronic money information;
   an IC card reader/writer reading data from, and writing data into, said IC card;
   credit unit supplying cash information from said IC card to said IC card reader/writer of the system;
   a payment unit supplying cash information from said IC card reader/writer of the system to said IC card; and
   a comparator comparing a credit money value supplied from said IC card to said IC card reader/writer of the system with a payment money value supplied from said IC card reader/writer of the system to said IC card,
   wherein after said credit unit operates, said payment unit is operated, said payment unit is controlled in accordance with a comparison result by said comparator, and in response to verification of a credit history of said IC card and a payment history of said IC card reader/writer of the system, said payment unit is controlled.

* * * * *